United States Patent [19]
Juhlin et al.

[11] Patent Number: 5,152,698
[45] Date of Patent: Oct. 6, 1992

[54] FLOOR TRACK SYSTEM FOR OFFICE FURNITURE AND THE LIKE

[75] Inventors: Gary S. Juhlin, Alto; Michael L. Deimen; Edmund X. Klipa, both of Grand Rapids, all of Mich.

[73] Assignee: Steelcase Inc., Grand Rapids, Mich.

[21] Appl. No.: 307,691

[22] Filed: Feb. 7, 1989

[51] Int. Cl.⁵ .................................................. H01R 25/16
[52] U.S. Cl. ...................................... 439/215; 439/210; 174/48
[58] Field of Search ......................... 52/126.3, 126.4; 160/135; 174/48, 71 R; 439/113, 115, 120, 207–216

[56] References Cited

U.S. PATENT DOCUMENTS

| | | | |
|---|---|---|---|
| Re. 31,733 | 11/1984 | Haworth et al. | 339/4 |
| 2,611,800 | 9/1952 | Naughton | 173/334.1 |
| 2,798,172 | 7/1957 | Jones | 307/147 |
| 3,061,810 | 10/1962 | Boyd | 439/120 |
| 3,404,706 | 10/1968 | D'Esopo | 138/163 |
| 3,683,101 | 8/1972 | Liberman | 174/49 |
| 3,708,607 | 1/1973 | Brode et al. | 174/48 |
| 3,753,323 | 8/1973 | Nesbitt | 52/169 |
| 3,886,698 | 6/1975 | Raith et al. | 52/36 |
| 3,916,972 | 11/1975 | Breiner | 160/135 |
| 3,918,223 | 11/1975 | Carlsson | 52/221 |
| 3,949,827 | 4/1976 | Witherspoon | 181/33 |
| 3,990,204 | 11/1976 | Haworth et al. | 52/239 |
| 3,990,205 | 11/1976 | Davis | 52/241 |
| 4,043,626 | 8/1977 | Propst et al. | 339/23 |
| 4,094,561 | 6/1978 | Wolff et al. | 312/223 |
| 4,120,124 | 10/1978 | Temple et al. | 52/122 |
| 4,133,153 | 1/1979 | Hage | 52/220 |
| 4,135,775 | 1/1979 | Driscoll | 339/22 |
| 4,224,769 | 9/1980 | Ball et al. | 52/36 |
| 4,231,630 | 11/1980 | Propst et al. | 339/22 |
| 4,235,495 | 11/1980 | Propst et al. | 339/22 |
| 4,239,932 | 12/1980 | Textoris et al. | 174/48 |
| 4,241,965 | 12/1980 | Wilson et al. | 339/4 |
| 4,255,610 | 3/1981 | Textoris | 174/48 |
| 4,257,203 | 3/1981 | Propst et al. | 52/221 |
| 4,278,834 | 7/1981 | Boundy | 174/48 |
| 4,296,579 | 10/1981 | Proud | 52/239 |
| 4,308,418 | 12/1981 | Van Kuik et al. | 174/48 |
| 4,360,705 | 11/1982 | Rogers | 174/48 |
| 4,376,561 | 3/1983 | Vanden Hoek et al. | 339/21 |
| 4,377,724 | 3/1983 | Wilson | 174/48 |
| 4,382,648 | 5/1983 | Propst et al. | 339/18 |
| 4,429,934 | 2/1984 | Vanden Hoek et al. | 339/22 |
| 4,433,630 | 2/1984 | Laborie | 108/50 |
| 4,470,232 | 9/1984 | Condevaux et al. | 52/220 |
| 4,503,655 | 3/1985 | Yeager et al. | 52/747 |
| 4,538,390 | 9/1985 | Yeager et al. | 52/221 |
| 4,593,505 | 6/1986 | Russell | 52/221 |
| 4,596,098 | 6/1986 | Finkbeiner et al. | 52/220 |
| 4,634,212 | 1/1987 | Boundy et al. | 339/198 |
| 4,666,223 | 5/1987 | Tillmann | 339/32 R |
| 4,713,918 | 12/1987 | Cioffi | 174/48 |

FOREIGN PATENT DOCUMENTS 0174733 3/1986 European Pat. Off. .
2854083 1/1980 Fed. Rep. of Germany ...... 160/135

OTHER PUBLICATIONS

"Context Freestanding Furniture System", literature by Steelcase, Inc., 1989.
Western Electric, "Fiber Lightguide Connector," Technical Digest, No. 55, Jul. 1979.

*Primary Examiner*—Gary F. Paumen
*Attorney, Agent, or Firm*—Price, Heneveld, Cooper, DeWitt & Litton

[57] ABSTRACT

A floor track system is provided to route utilities to workstations in open office plans, and the like. The floor track system includes a plurality of individual floor track segments, each of which has a hollow interior in which the utilities are housed and isolated. Each floor track segment also includes feet which independently support the track segment on the floor in a generally upright orientation, and an exterior shape which physically mates with the furniture units in the workstation, without supporting the same. Opposite ends of the floor track segments are detachably interconnected in a predetermined configuration to form a continuous, self-contained and self-supported utility raceway that is physically separate from the furniture units, yet dimensionally cooperates and blends in with them. Utility taps can be located throughout the floor track system to provide utilities to each of the workstations as required.

40 Claims, 20 Drawing Sheets

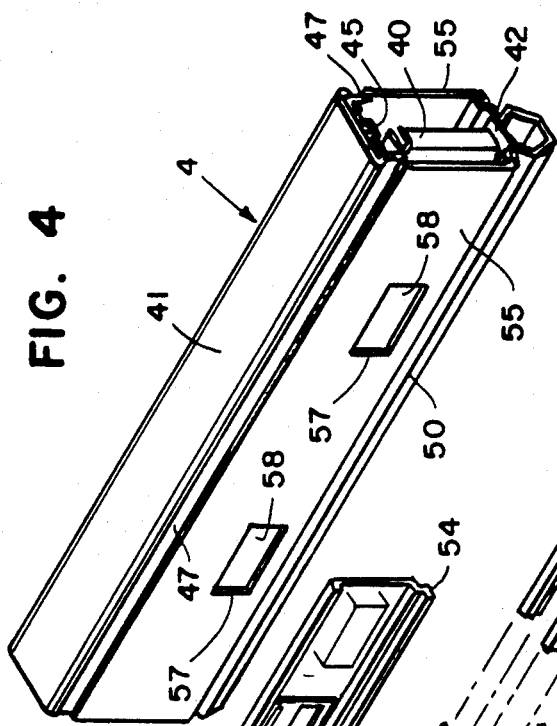
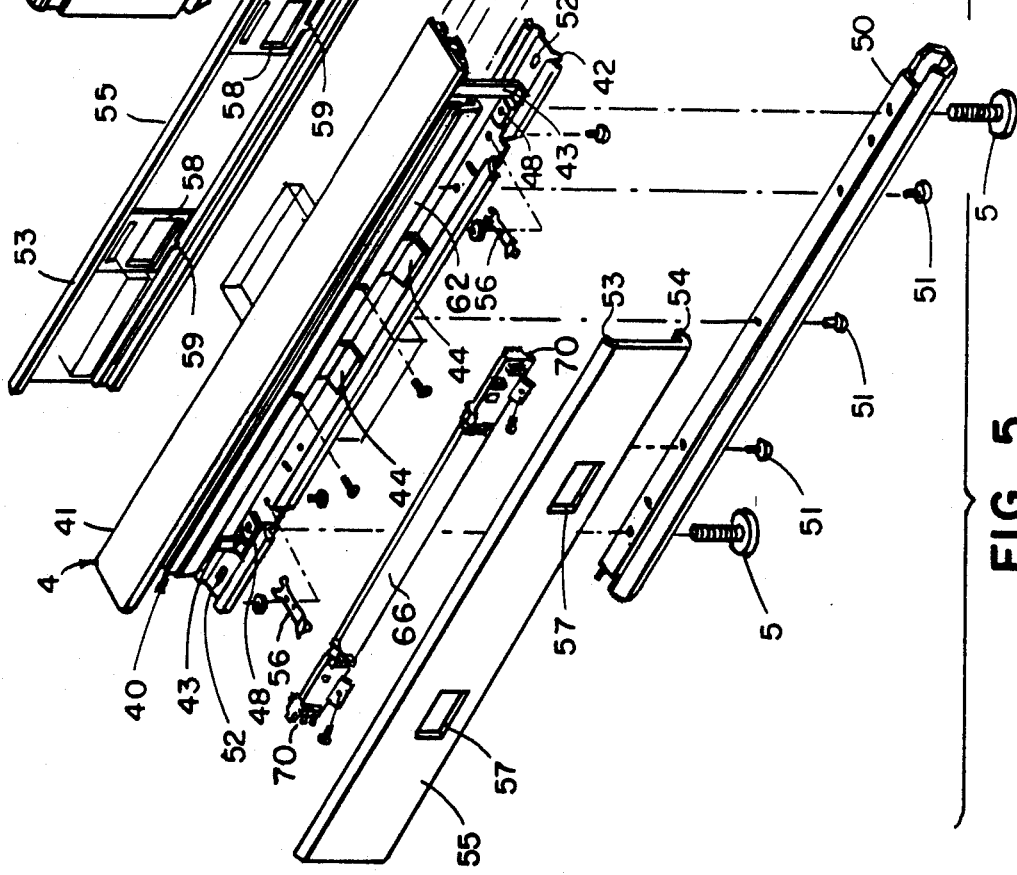

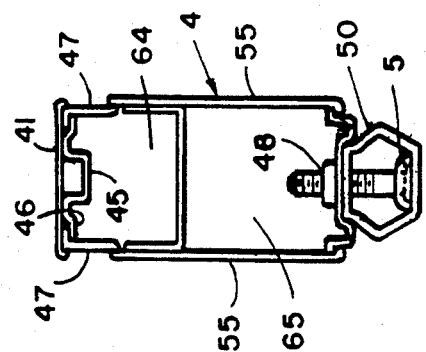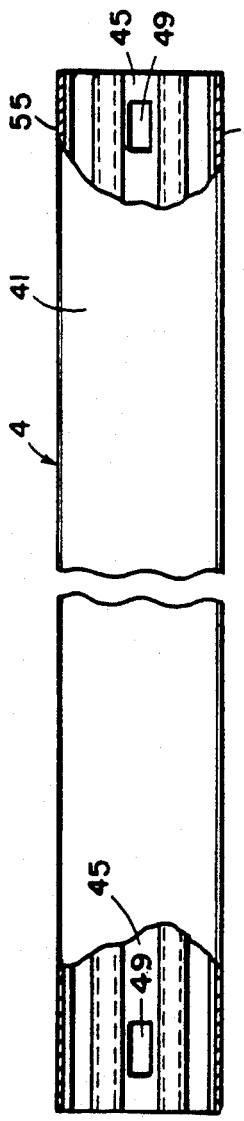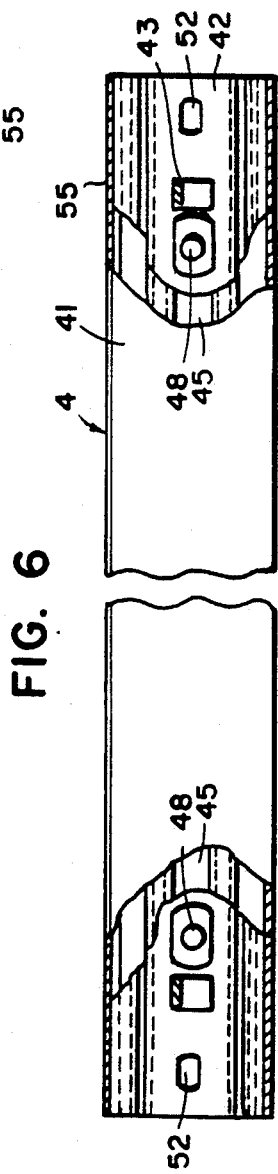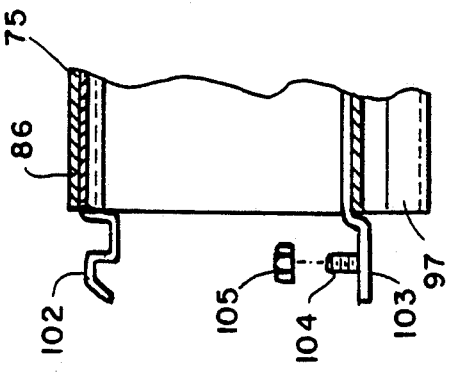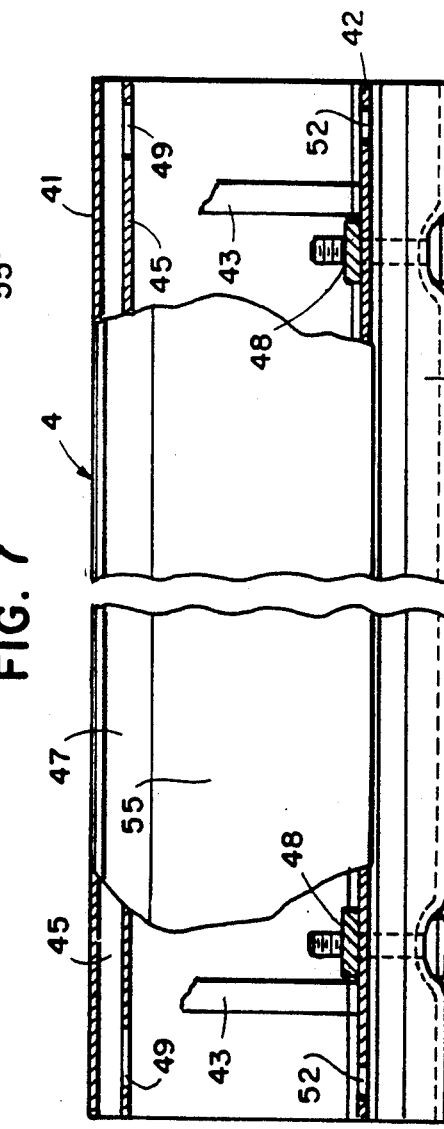

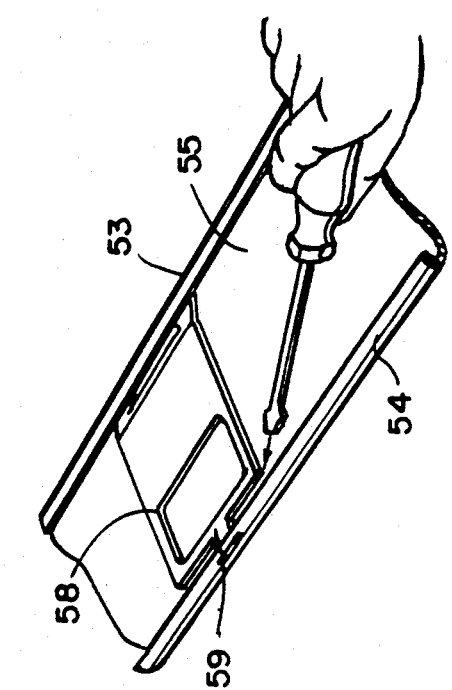
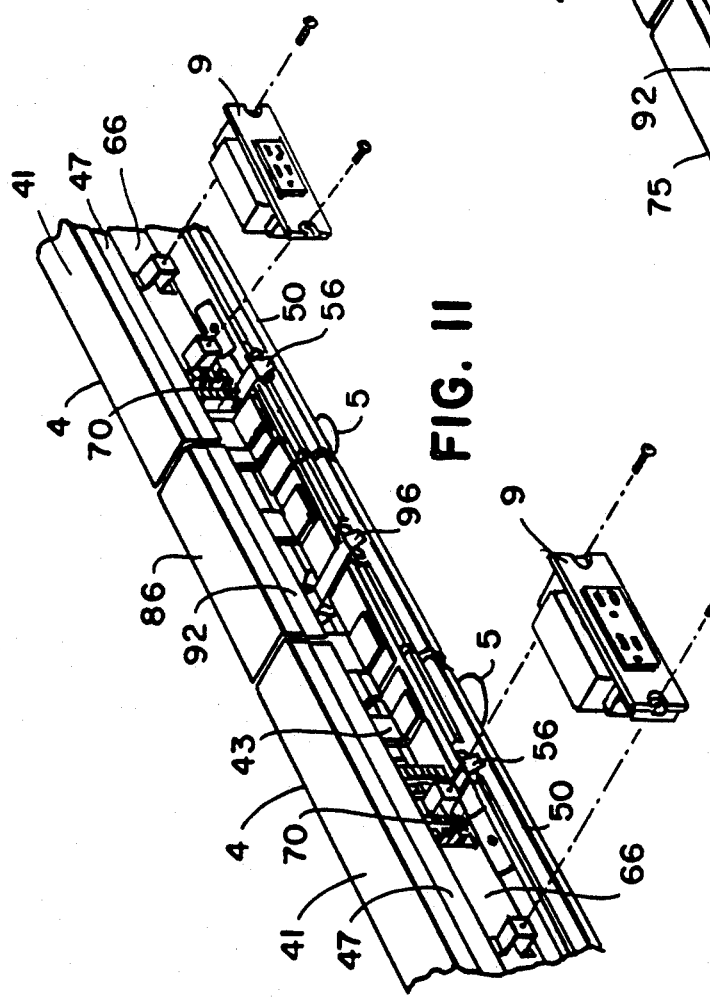
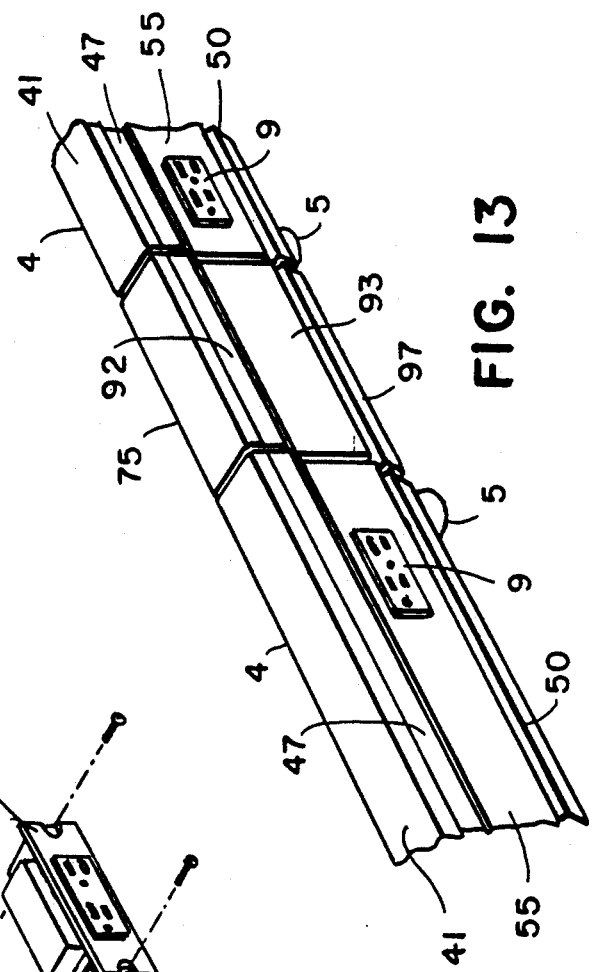

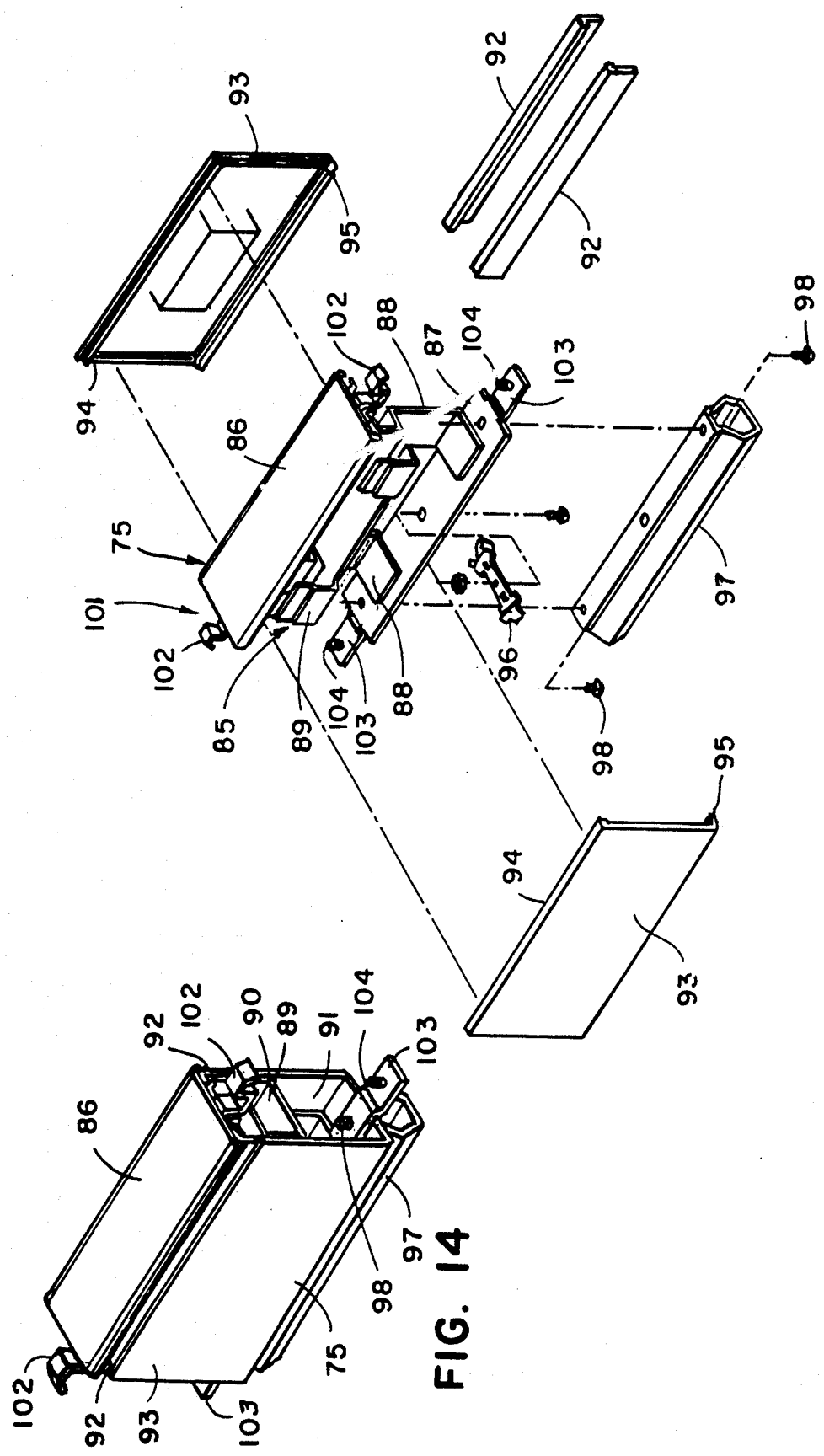

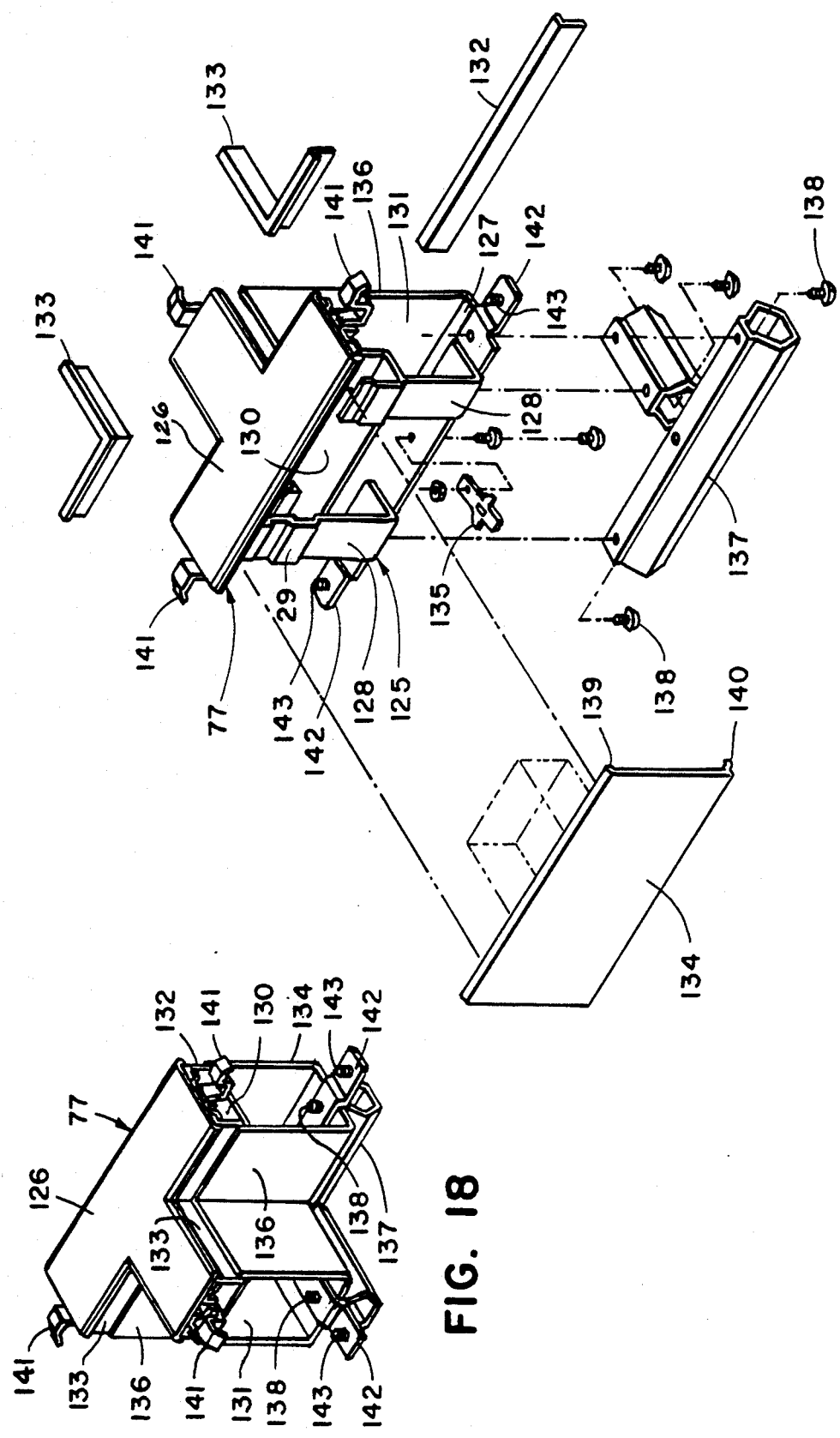

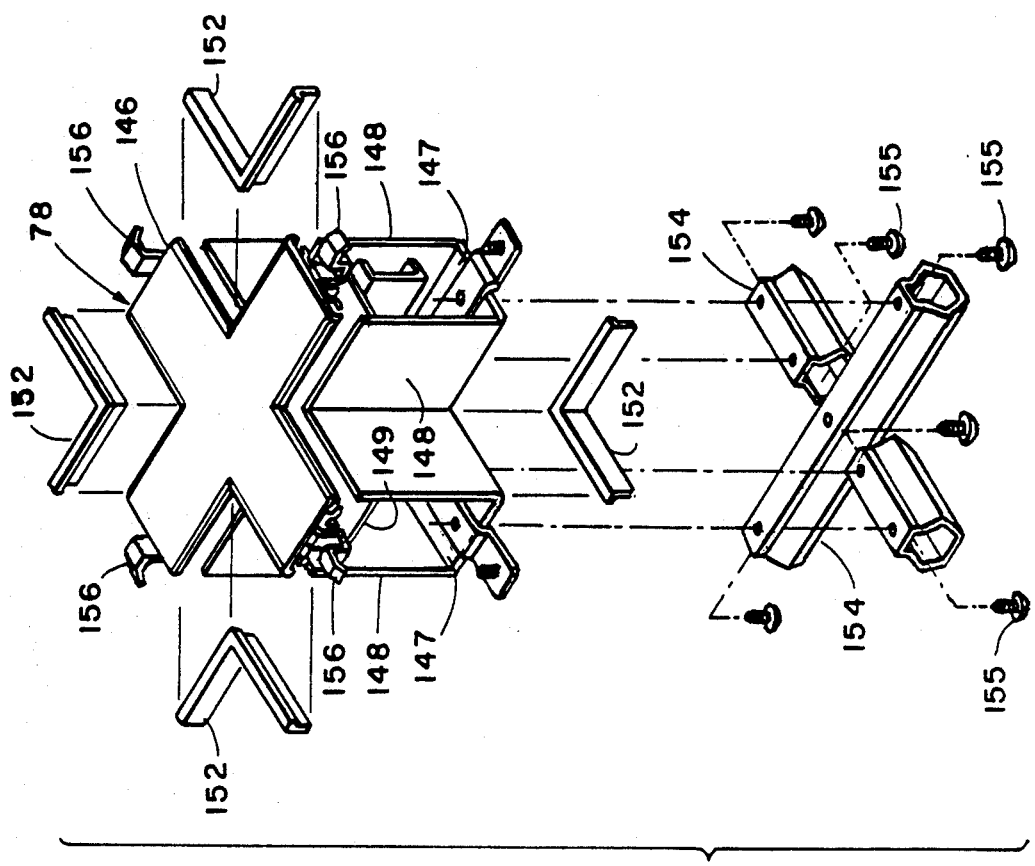
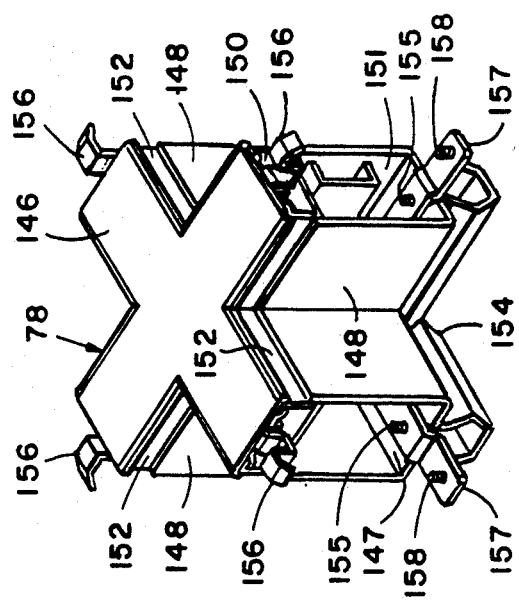
FIG. 20
FIG. 21

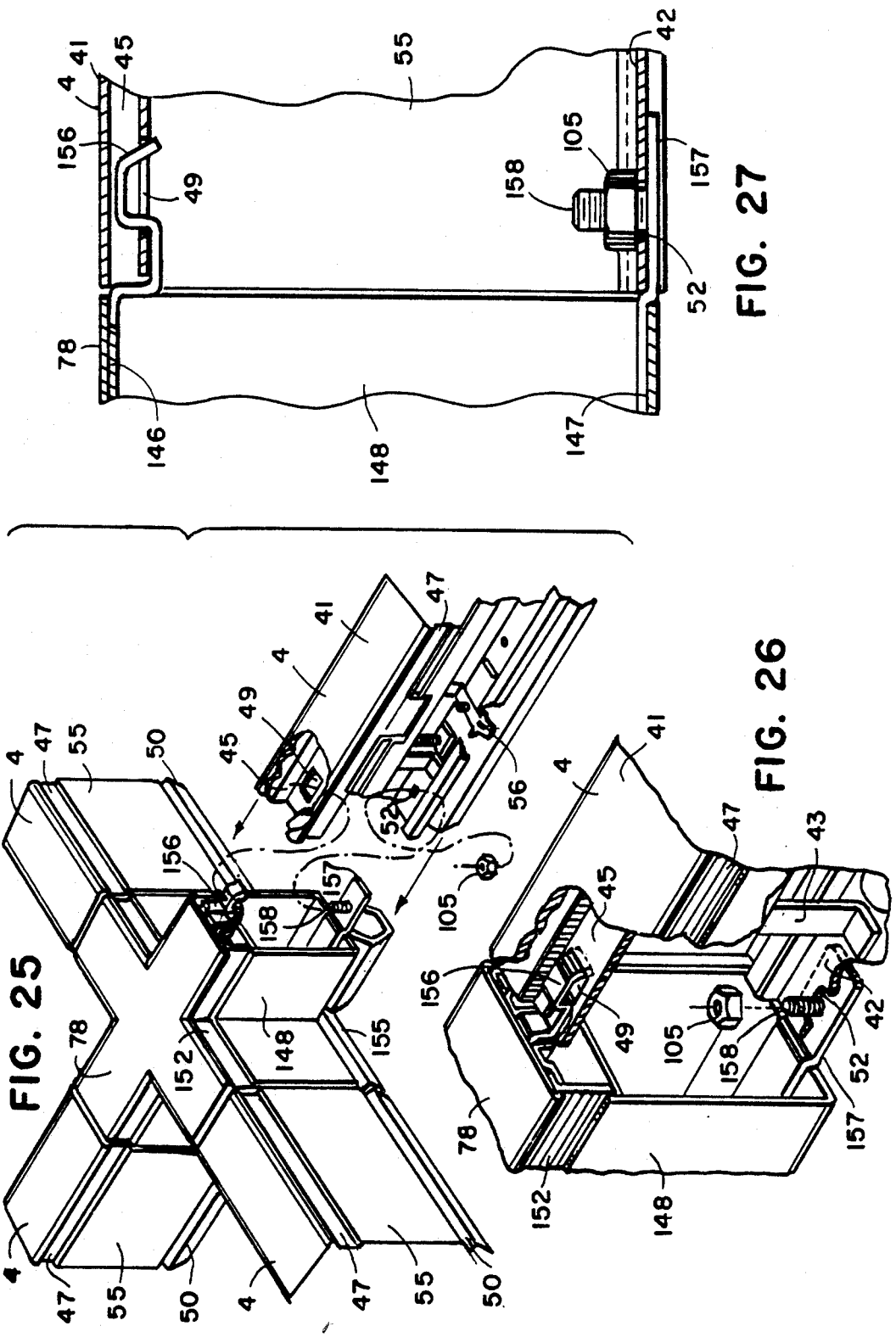

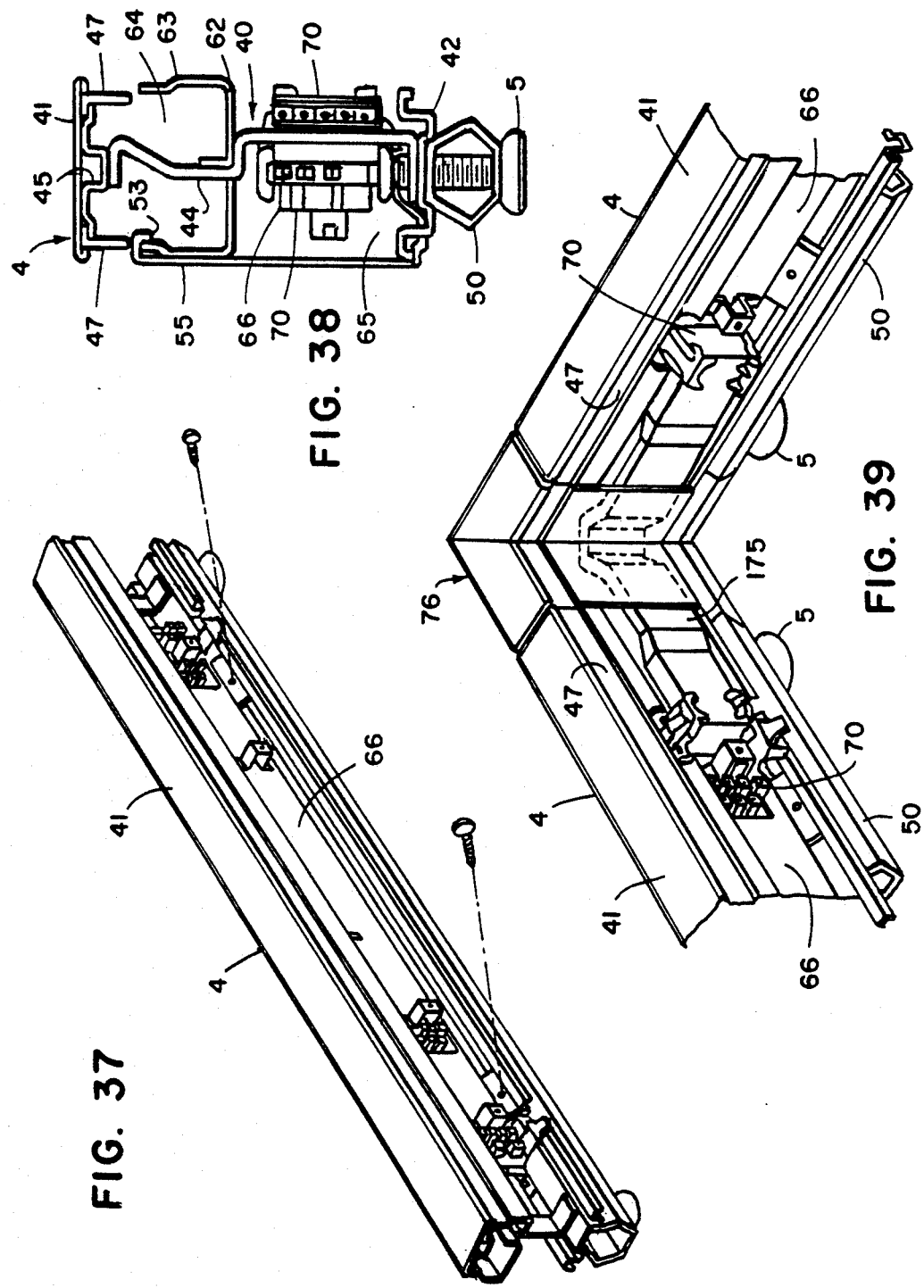

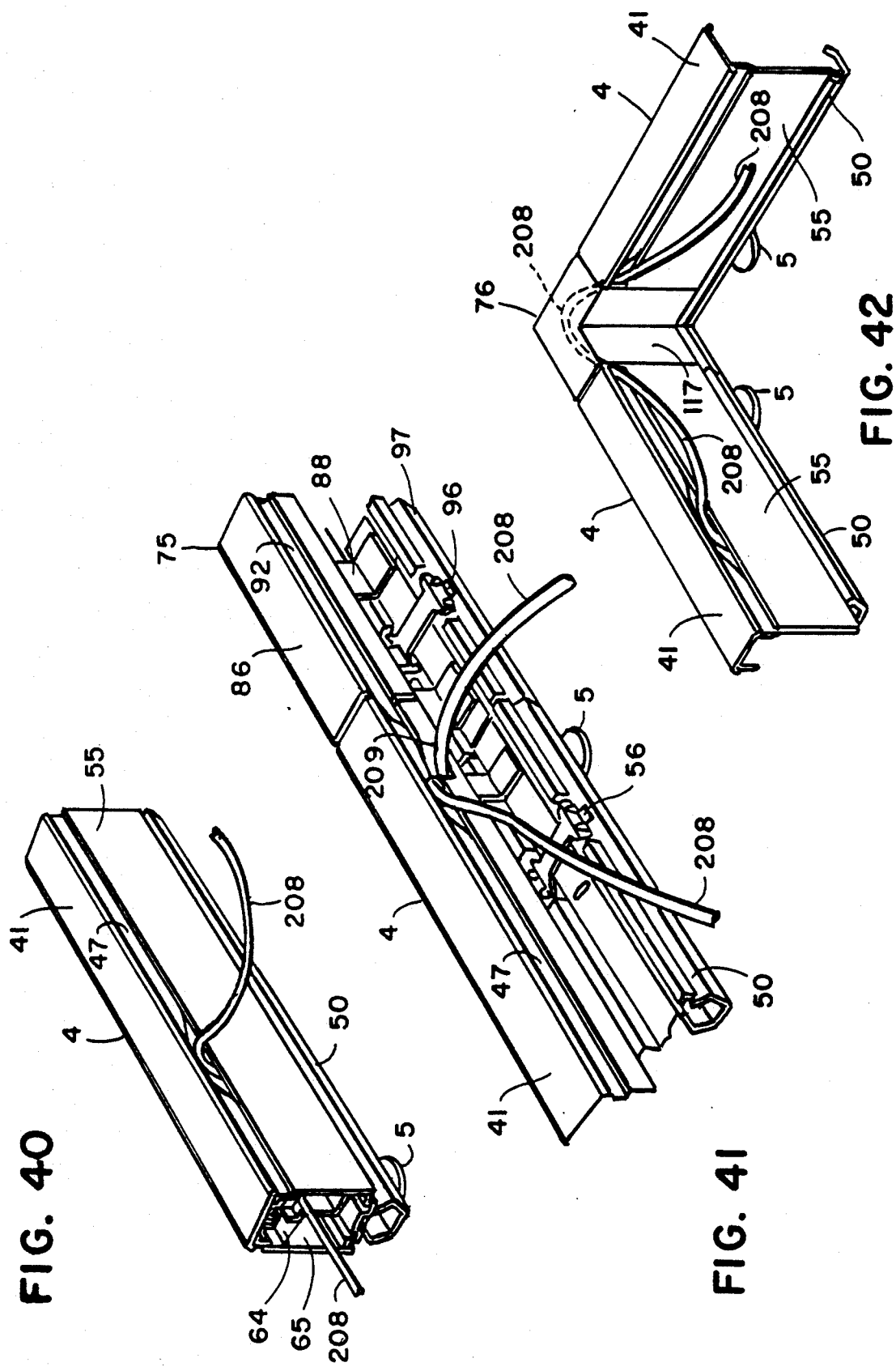

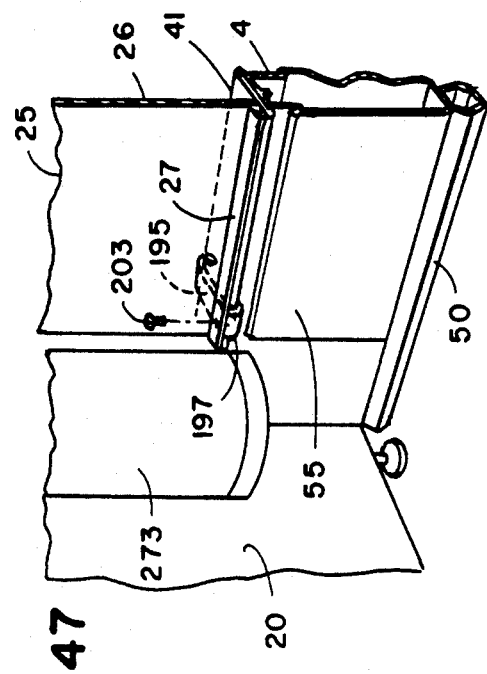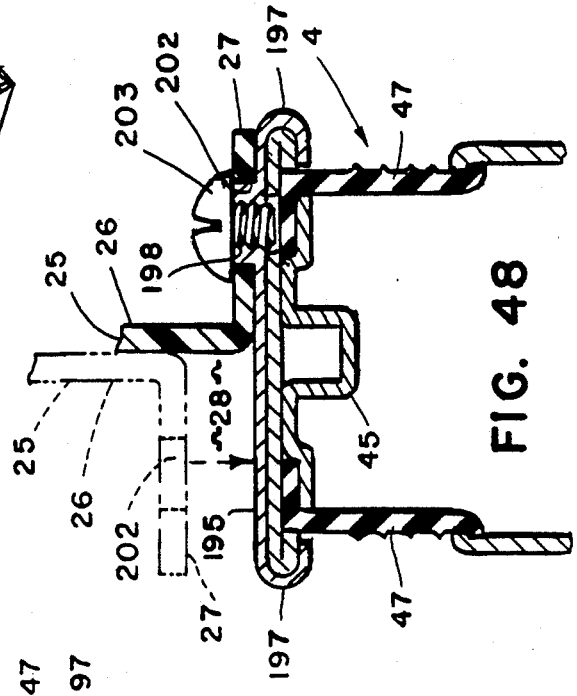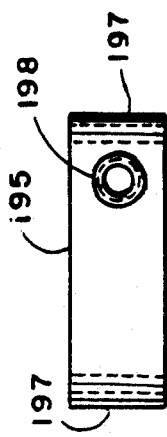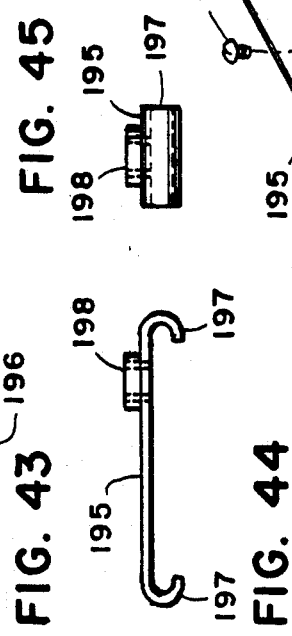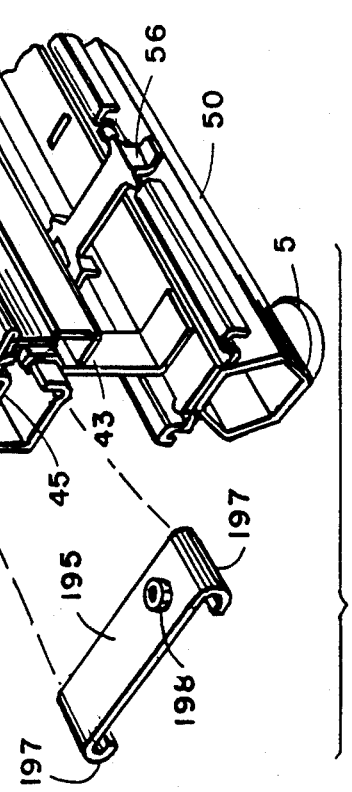

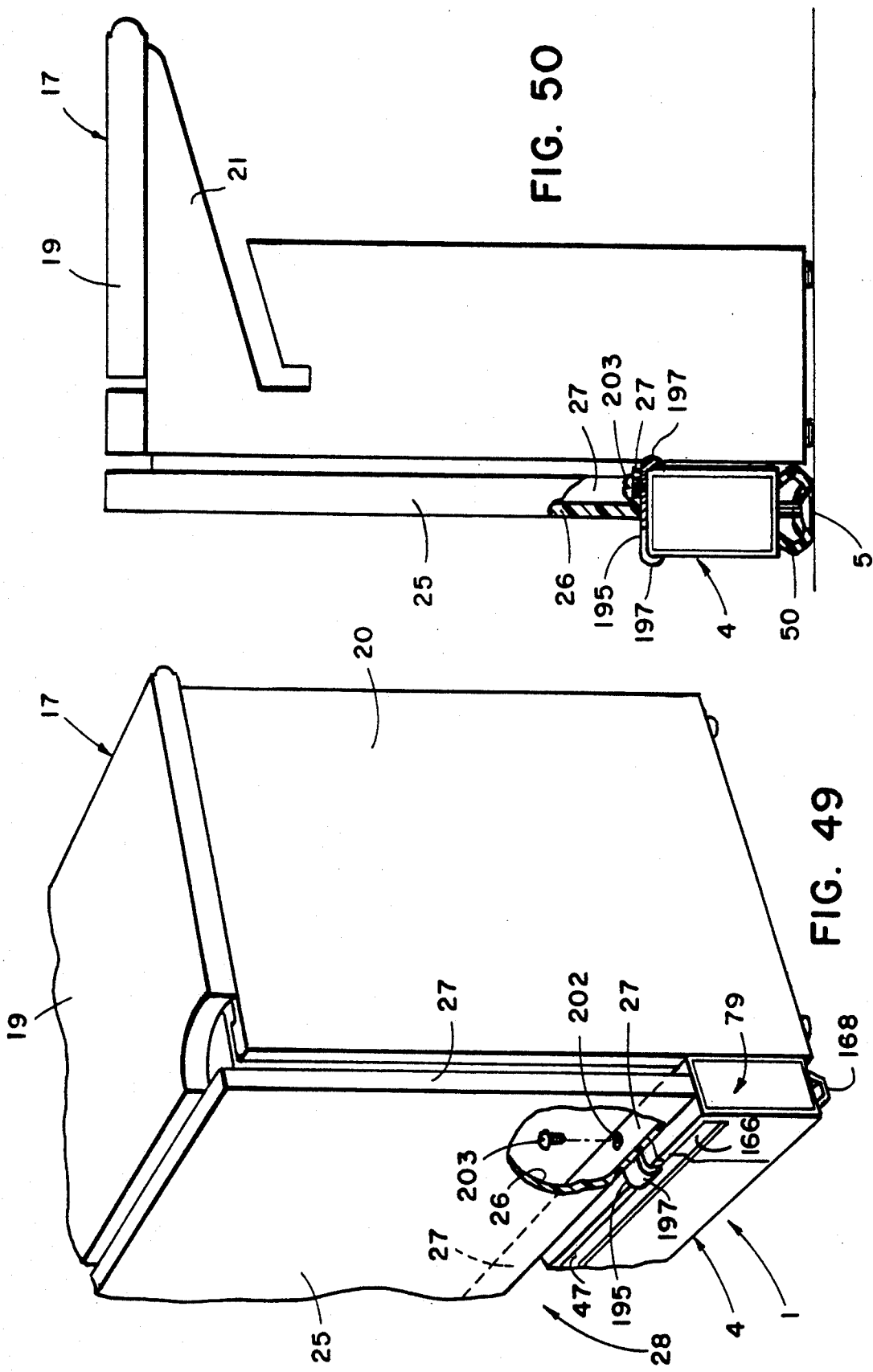

FLOOR TRACK SYSTEM FOR OFFICE FURNITURE AND THE LIKE

CROSS-REFERENCE TO RELATED APPLICATION

The present application is related to co-pending U.S. patent application Ser. No. 307,775, filed Feb. 7, 1989, entitled MODULAR FURNITURE, which is hereby incorporated by reference.

BACKGROUND OF THE INVENTION

The present invention relates to furnishings for offices and the like, and in particular to a floor track system which is especially adapted to route utilities to workstations in open office plans, and other similar settings.

Open office plans are well known in the art, and generally comprise large, open floor spaces that are partitioned off into individual workstations by movable panels. Such partition panels often include an electrical raceway along the bottom of the panel to provide electrical power to the various workstations. Two examples of such open office plans are disclosed in the Propst et al. U.S. Pat. No. 4,235,495 and the Driscoll U.S. Pat. No. 4,135,755.

Partition panels in such open office plans are typically configured to receive hang-on furniture units, such as work surfaces, overhead cabinets, shelves, etc., so that the panels become an integral part of the workstation furnishings. One example of such a partition panel arrangement is disclosed in the Breiner U.S. Pat. No. 3,916,972. These partition panels and hang-on furniture arrangements are usually known in the office furniture industry as "systems furniture." Such systems furniture arrangements have some inherent restrictions in versatility, since each workstation must necessarily include certain types of partition panels in order to support the hang-on furniture units. Furthermore, the hang-on furniture units can be assembled only in a limited number of different arrangements.

A unique alternative arrangement for dividing and partitioning open office plans is disclosed in related co-pending application Ser. No. 307,775, filed Feb. 7, 1989, entitled MODULAR FURNITURE, which has been incorporated by reference into the present application. This new arrangement provides a plurality of individual furniture units, each of which is independently supported on the floor of the open office. The furniture units have a novel modular construction which permits them to be individually arranged and combined in a predetermined configuration to create a selected number of distinct workstations.

The present floor track system is particularly adapted to provide utilities, such as electrical power, communication cables, etc. to this new modular furniture arrangement, and is also capable of being used in many other settings

SUMMARY OF THE INVENTION

One aspect of the present invention is to provide a unique floor track system for office furniture and the like, of the type which includes individual furniture articles that are selectively positioned on the floor of an open office plan to define various workstations. The floor track system comprises a plurality of elongate floor track segments, each of which has a hollow construction with an exterior wall shaped to define a longitudinally extending duct therein adapted to receive and isolate utilities. Each floor track segment also includes a foot arrangement which abuttingly engages the floor surface, and independently supports the floor track segment in a generally upright orientation on the floor surface. Connectors are located at opposite ends of each floor segment to detachably interconnect adjacent floor segments in an end-to-end fashion to form a continuous, self-contained and self-supported utility raceway that is physically separate from the furniture articles. Utility taps which mate with the raceway can be positioned at various locations adjacent to the workstations to provide utilities to the same.

Preferably, the floor track segments have a generally linear configuration, and differently shaped track connectors, such as in-line connectors, L-connectors, T-connectors, and X-connectors interconnect the opposite ends of the floor track segments to form the desired network. End-of-run caps close each run in the network to provide a closed system. The modular furniture articles preferably have a base with a recess in which at least a portion of an associated floor track segment is received to physically mate and blend into the floor track system. Stabilizer brackets may also be provided to positively connect the raceway with one or more of the furniture units to prevent inadvertently dislodging the raceway from its predetermined configuration. Separate cable wireways and power wireways may be provided in both the tracks segments and the connectors to facilitate routing different types of electrical utilities to each of the workstations.

The principal objects of the present invention are to provide a floor track network or system which conveniently routes utilities to workstations in an open office plan. The floor track system is physically separate from the furnishings, and has a self-contained and self-supported raceway arrangement that may be readily assembled on the floor of the open office plan prior to the installation of any furnishings. Although the floor track system is physically independent from the furniture, it preferably mates with the furniture to dimensionally blend into the same. The floor track system is configured to receive utilities in the system, and permit the same to be tapped out of the system at a wide variety of convenient locations. Separate track segments and connectors may be used to form the track system in a wide variety of different configurations. Separate powerways and power connectors may also be used to provide a completely self-contained and modular construction for the various portions of the track system.

The track system has a durable uncomplicated design which can be easily and quickly assembled and disassembled. The track system is efficient in use, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 4 is a perspective view of a single, floor track segment.

FIG. 5 is an exploded view of the floor track segment, and an associated powerway.

FIG. 6 is a top plan view of the floor track segment, with end portions thereof broken away to reveal an upper connector.

FIG. 7 is a top plan view of the floor track segment, with end portions thereof broken away to reveal a lower connector.

FIG. 8 is a side elevational view of the floor track segment, with end portions thereof broken away to reveal the upper and lower connectors.

FIG. 9 is an end elevational view of the floor track segment.

FIG. 10 is a fragmentary cross-sectional view of a connector, with portions thereof broken away to reveal mating connectors.

FIG. 11 is a perspective view of the floor track system, with electrical taps shown in an exploded condition.

FIG. 12 is a perspective view of a base cover portion of the floor track system.

FIG. 13 is a perspective view of the floor track system, showing the electrical taps and base covers mounted in place.

FIG. 14 is a perspective view of an in-line track connector.

FIG. 15 is an exploded perspective view of the in-line track connector.

FIG. 18 is a perspective view of a T-connector.

FIG. 19 is an exploded perspective view of the T-connector.

FIG. 20 is a perspective view of an X-connector.

FIG. 21 is an exploded perspective view of the X-connector.

FIG. 25 is a perspective view of a selected portion of the floor track system, wherein portions thereof are broken away to show the connection of a track segment with an X-connector.

FIG. 26 is an enlarged, fragmentary perspective view of the track system, with portions thereof broken away to illustrate the connection of a track segment and a connector.

FIG. 27 is an enlarged, vertical cross-sectional view of the connecting portions of a track segment and a connector.

FIG. 37 is a perspective view of a floor track segment, showing the installation of a powerway therein.

FIG. 38 is an end elevational view of the floor track segment, showing the powerway mounted in place.

FIG. 39 is a perspective view of a selected portion of the floor track system, showing a power connector spanning two track segments, and threaded through an L-connector.

FIG. 40 is a perspective view of a floor track segment, showing casual wiring partially installed therein.

FIG. 41 is a perspective view of a floor track segment and an in-line connector, showing casual wiring partially installed therein.

FIG. 42 is a perspective view of a selected portion of the floor track system, showing casual wiring partially installed into track segments, and threaded through an L-connector.

FIG. 43 is a top plan view of a stabilizer bracket.

FIG. 44 is a side elevational view of the stabilizer bracket.

FIG. 45 is an end elevational view of the stabilizer bracket.

FIG. 46 is an exploded view of the stabilizer bracket, and an associated portion of a floor track segment.

FIG. 47 is a perspective view of a stabilizer bracket shown connecting an associated floor track segment to a modular furniture unit.

FIG. 48 is an enlarged vertical cross-sectional view of the stabilizer bracket, shown connecting a floor track segment to a modular furniture unit.

FIG. 49 is a perspective view of a modular furniture unit and an associated floor track segment assembly, with portions thereof broken away to illustrate their interconnection by a stabilizer bracket.

FIG. 50 is a side elevational view of the arrangement illustrated in FIG. 49, with a portion thereof broken away to illustrate the stabilizer bracket.

DETAILED DESCRIPTION OF THE PREFERRED EMBODIMENTS

Figure 1:
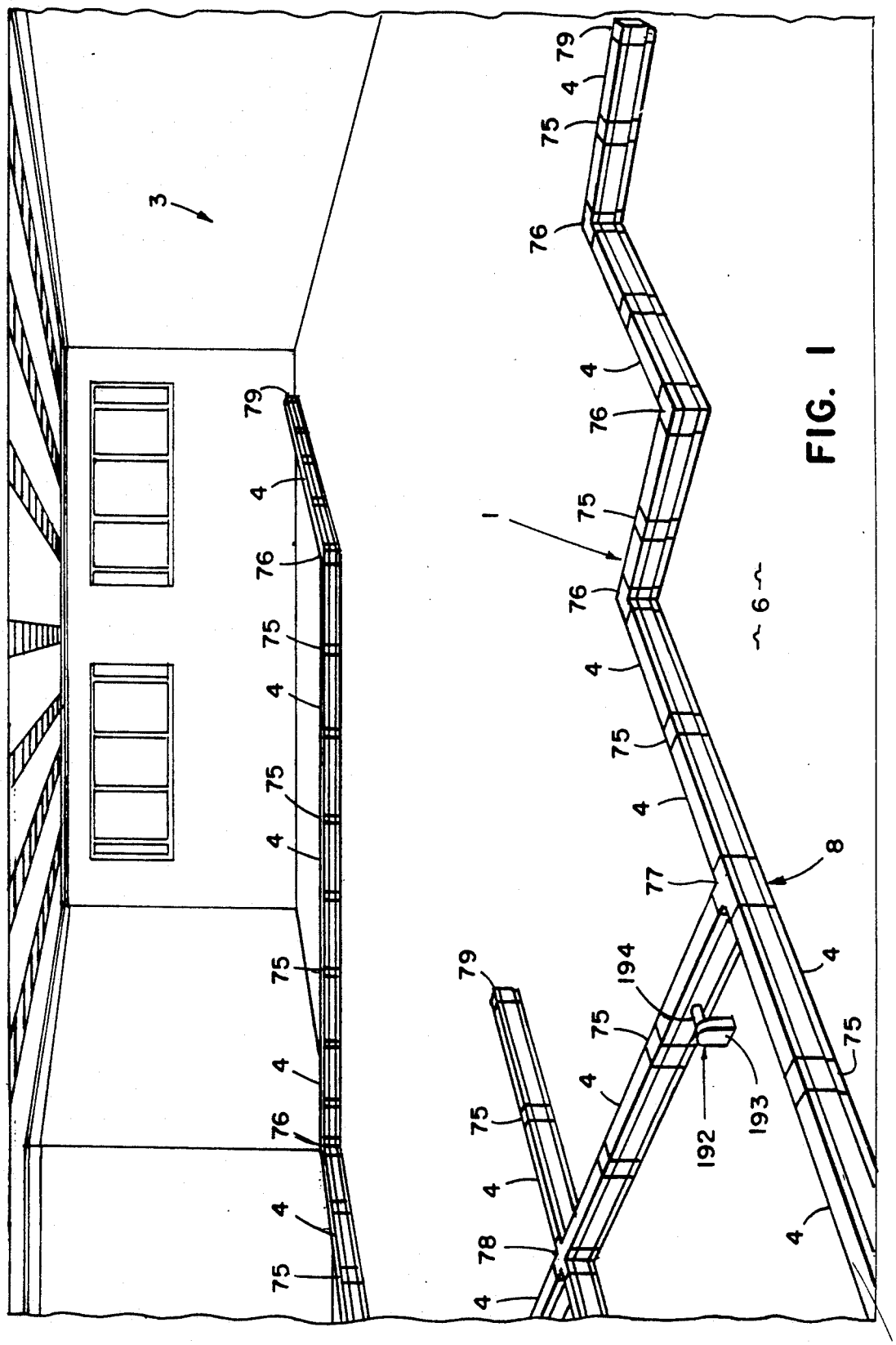
FIG. 1 is a perspective view of a floor track system embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein, are not to be considered as limiting, unless the claims expressly state otherwise.

The reference numeral 1 (FIG. 1) generally designates a floor track network or system embodying the present invention. Floor track system 1 is designed to route utilities to workstations 2 (FIG. 2) in open office spaces or plans 3, and other similar commercial settings. Floor track system 1 includes a plurality of individual floor track segments 4, each of which has a hollow interior in which the utilities are housed and isolated. Each floor track segment 4 has feet 5 (FIG. 5) adjacent opposite ends thereof, which independently support the track segment 4 on the floor 6 of building space 3 in a generally upright orientation. Each floor track segment 4 (FIG. 2) also has an exterior shape which physically mates with the furniture units 7 in workstations 2, without supporting the same. Opposite ends of floor track segments 4 are detachably interconnected in a predetermined configuration, preferably by differently shaped connectors 8, so as to form a continuous, self-contained and self-supported utility raceway that is physically separate from the furniture units 7, yet dimensionally cooperates and blends in with them. Floor track system 1 permits locating utility taps, such as the electrical receptacle 9 illustrated in FIG. 13, throughout the system, so as to provide utilities to each of the workstations 2 as required.

As will be appreciated by those skilled in the art, floor track system 1 can be used to route a wide variety of different utilities to the workstations 2. In the present example, floor track system 1 is particularly adapted to route electrical wiring, and the like, such as 110 V and 220 V power lines, signal cables, communication lines, and other similar wiring and cabling that is required to equip and support modern office equipment.

Figure 2:
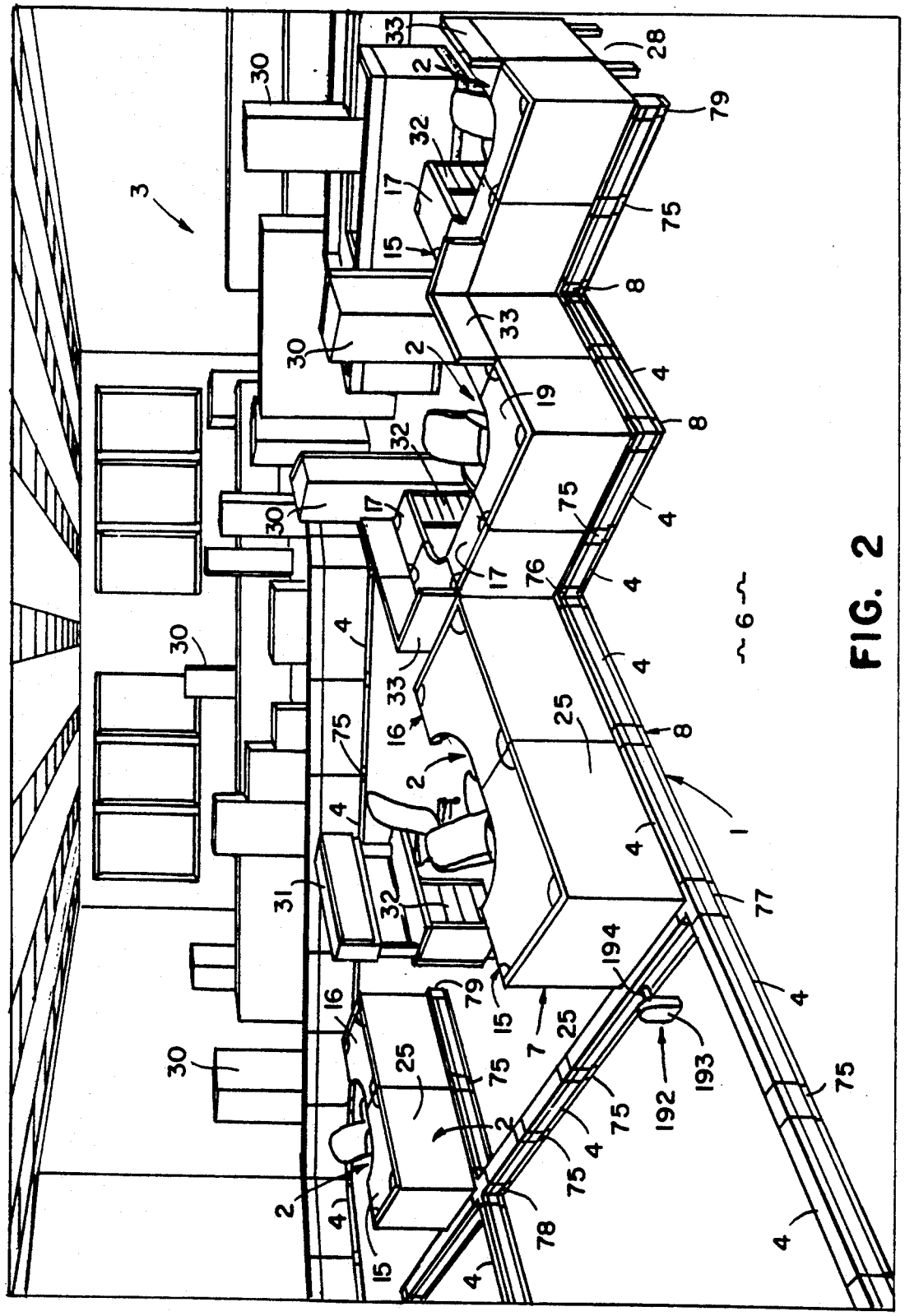
FIG. 2 is a perspective view of the floor track system, shown with modular furniture positioned in place over portions of the same.
Figure 3:
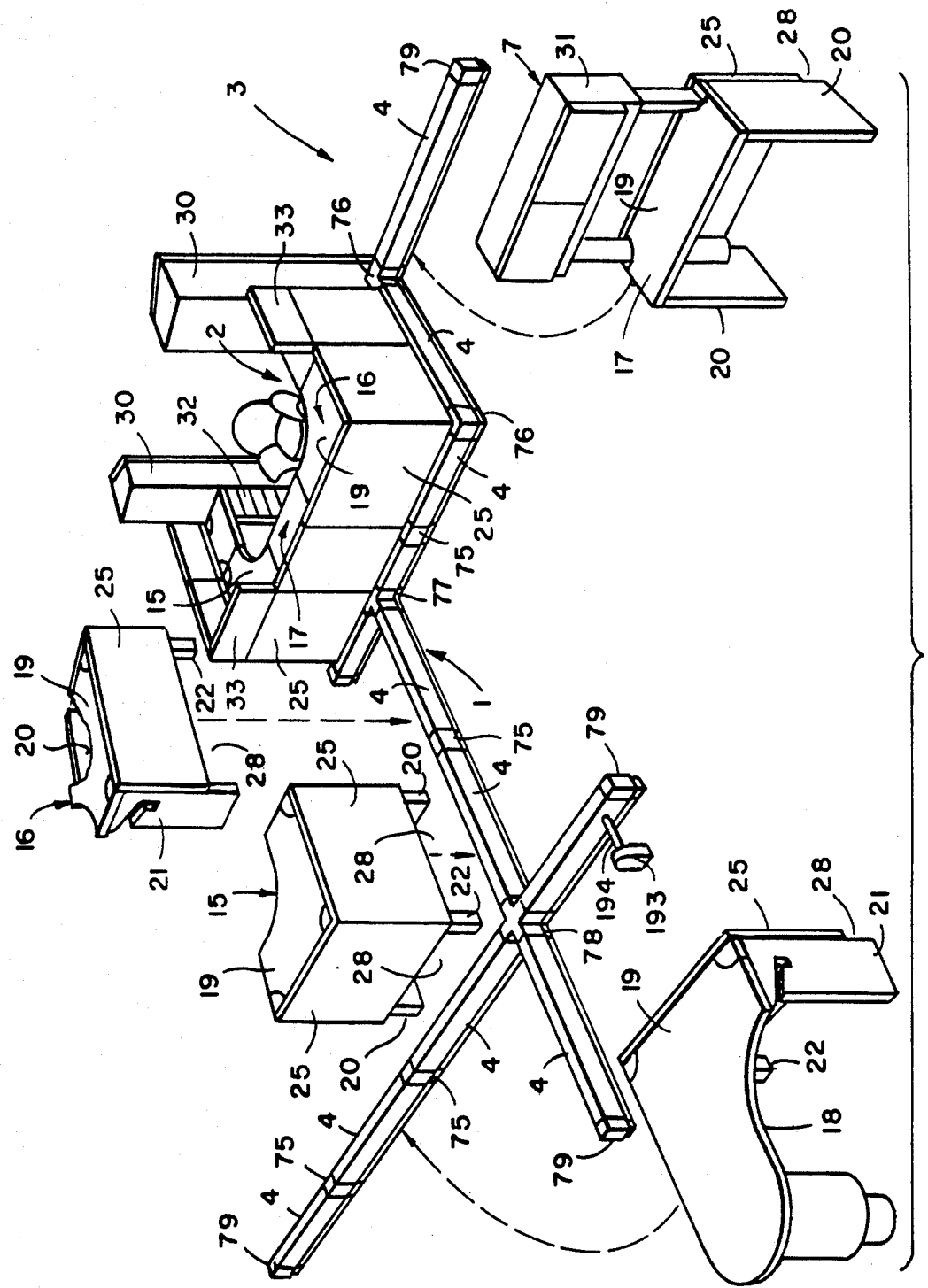
FIG. 3 is an exploded perspective view of the floor track system in an alternative configuration.

With reference to FIGS. 2 and 3, floor track system 1 is particularly adapted for use in conjunction with a unique modular furniture arrangement which is the subject of co-pending patent application Ser. No. 307,775, filed Feb. 7, 1989, entitled MODULAR FURNITURE. The illustrated furniture arrangement comprises a plurality of individual furniture units 7, each of which is independently supported on the floor 6 of office space 3, and is shaped to cooperate with other, related furniture units to form workstations 2. In the examples illustrated in FIGS. 2 and 3, several different types of modular furniture units 7 are illustrated, which are individually designated by the reference numerals 15-18 respectively. When floor track system 1 is used in conjunction with the unique modular furniture units 7, it is presently contemplated that when fully operational, furniture units 7 will be positioned over nearly each portion of the floor track system 1.

Each of the illustrated furniture units 15-18 includes a work surface 19 selected from a wide variety of different shapes and sizes, and two, separate supports at the ends of work surface 19, in the form of either an end panel 20, or an intermediate support 21. For example, the left-hand corner unit 16 (FIG. 3) has an intermediate support 21 at one side of work surface 19, and an end panel 20 at the opposite side of work surface 19. In contrast, the straight unit 17 has two end panels 20 at the opposite sides of the work surface 19. A corner leg 22 is provided at the center of the right-hand corner unit 15, the left-hand corner unit 16, and the bullet conference unit 18.

Each of the illustrated modular furniture units 15-18 also includes at least one back panel 25, which covers the front faces or surfaces of the furniture unit. Of example, the straight unit 17 (FIG. 3) has a single back panel 25 which extends between the end panels 20 along the forward side of the furniture unit. Both the right-hand and left-hand corner units 15 and 16 have two back panels 25, which extend between the corner leg 22, and the associated end support.

As best illustrated in FIGS. 49 and 50, the back panels 25 have a hollow type of construction, including a front sheet 26 with in-turned edges or flanges 27 that form a three dimensional part which attaches directly to the forward edge of the end supports, comprising either an end panel 20, an intermediate support 21, or a corner leg 22. The back panels 25 have a specially designed, predetermined depth, so as to form a gap or recess 28 which extends along the forward base area of each of the furniture units 7, and is adapted to receive the floor track system 1 therein, as described in detail below. The arrangement illustrated in FIG. 3 clearly shows the recess 28 in each of the furniture units 15-18, and its physical cooperation with the floor track system 1.

In the open office plan arrangements illustrated in FIGS. 2 and 3, additional modular furniture units 7 and accessories are provided, including storage towers 30, overhead cabinets 31, freestanding pedestals 32, and privacy screens 33, which are attached to and extend upwardly from the forward edges of selected furniture units to provide a degree of privacy to the workstation 2. Many characteristics of these additional furniture units and accessories are unique, independent of floor track system 1, and are the subject of co-pending patent applications.

It is to be understood that floor track system 1 may also be used in conjunction with other types of furniture arrangements and systems. The illustrated modular furniture units 7 provide just one example of how floor track system 1 can be used.

In the illustrated example, floor track segments 4 have a generally straight plan configuration, and are substantially identically configured, so as to provide a modularized construction for floor track system 1. With reference to FIGS. 4 and 5, each floor track 4 includes a primary weld assembly 40, comprising a top plate 41, a bottom plate 42, and vertical spacers 43 and 44 which interconnect top and bottom plates 41 and 42. As best illustrated in FIGS. 6-10, a U-shaped channel 45 is attached to the lower side of top plate 41, and extends continuously therealong. Channel 45 has a pair of latch slots or apertures 49 through the lower web thereof at opposite ends of floor track 4 to facilitate interconnecting adjacent floor tracks 4, as will be described in detail hereinafter. The outer ends of channel 45 in conjunction with top plate 41 define spaces or slots 46 that extend continuously along the opposite sides of the floor track 4, and are adapted to receive and retain a pair of L-shaped, flexible wireway covers 47 therein, as described below. The bottom plate 42 (FIGS. 4-5) includes a pair of threaded apertures 48 at opposite ends thereof in which threaded feet 5 are matingly received, and serve to provide vertical adjustment for the opposite ends of floor track 4. An accordion-shaped, flexible light block or seal 50 is attached to the lower surface of bottom plate 42 by fasteners 51, and serves to close any gap which might exist between bottom plate 42 and the floor 6 of office space 3, so that light does not leak or shine beneath the floor track, thereby imparting a neat, finished appearance to floor track system 1. Bottom plate 42 also includes a pair of elongated latch apertures 52 adjacent the opposite ends of the floor track 4, which also serve to interconnect adjacent floor tracks in the manner described in detail below.

Each floor track 4 (FIGS. 4–5) also includes a pair of detachable base trim plates 55, which extend vertically between top and bottom plates 41 and 42 of weld assembly 40 along the length of floor track 4, and selectively enclose the sides of floor track 4. The illustrated base trim plates 55 have an upper lip 53 that hooks over an intermediate channel portion 62 of weld assembly 40, and a lower lip 54 which detachably connects with weld assembly 40 by spring clips 56. In the illustrated example, each base trim plate 55 includes a pair of rectangular openings 57 which are spaced adjacent the opposite ends of trim plate 55. The openings 57 are shaped to receive outlet receptacles 71 (FIGS. 11–13) therethrough, and are otherwise closed by a removable cover plate 58 positioned over the interior side of base trim plate 55. A leaf spring type tab 59 detachably retains the associated cover plate 58 in place on base trim plate 55.

As best illustrated in FIG. 38, weld assembly 40 also includes an intermediate channel 62, which has a generally U-shaped configuration, and is rigidly attached to and supported by spacers 43 and 44. Intermediate channel 62 has outer flanges 63 which extend upwardly to a point adjacent to flexible wireway covers 47, with their upper edges adapted to mate with the upper lip 53 of an associated base trim plate 55. Intermediate channel 6 divides the interior of floor track 4 into two isolated areas, comprising an upper area 64 adapted to receive and retain low voltage or communication cabling therein, such as telephone wires, computer lines, communication wires, and the like, and a lower area 65 adapted to receive and retain a powerway 66 therein.

In the example illustrated in FIGS. 4 and 5, the powerways 66 have a known prefabricated construction, such as that disclosed in U.S. Pat. No. 4,429,934 to Vanden Hoek et al. Each powerway 66 is a self-contained assembly, and includes electrical connectors 70 positioned adjacent opposite ends of the powerway. The electrical connectors 70 are of the quick-disconnect type, and serve to electrically connect outlet receptacles 9 (FIGS. 11 and 13) to the floor track system.

Preferably, floor tracks 4 are provided in several different lengths to adapt floor track system 1 for a wide variety of different furniture configurations. The desired floor track length is selected in accordance with the width of the associated furniture unit 7. In each case, the length of the selected floor track 4 is slightly less than the length of that portion of the recess 28 disposed between the inside surfaces of the furniture end supports 20, 21, or 22, which in the case of straight unit 17, is the inside surfaces of opposite end panels 20. In other words, the length of floor track 4 is selected so that it does not extend in front of the furniture end supports 20, 21 or 22. In this manner, both of the base trim plates 55 can be removed from either side of the floor track 4 at any time, since there is no interference between the base trim plates 55 and the end supports 20, 21 or 22 of the associated furniture unit 7.

When floor track system 1 is used in conjunction with the unique modular furniture units 7 illustrated in FIGS. 2 and 3, floor tracks 4 and connectors 8 preferably have a total width that is approximately twice the width of the furniture recesses 28. In this manner, when adjacent furniture units are positioned back panel 25 to back panel 25, the two furniture recesses 28 will easily receive floor tracks 4, and in-line connectors 27 therein.

Figures 16, 17:
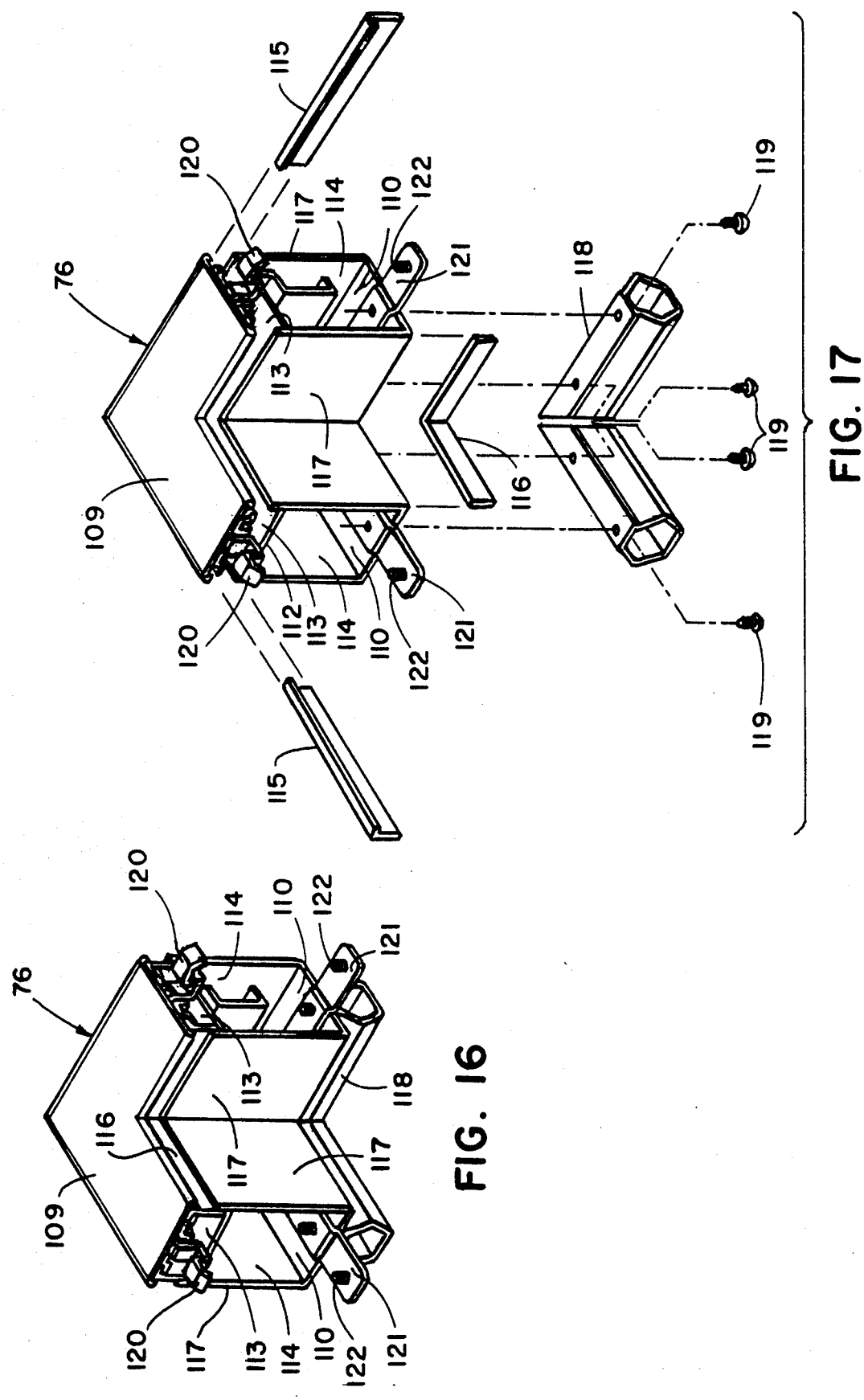
FIG. 16 is a perspective view of a 90 track connector.
FIG. 17 is an exploded perspective view of the 90° track connector.
Figure 24:
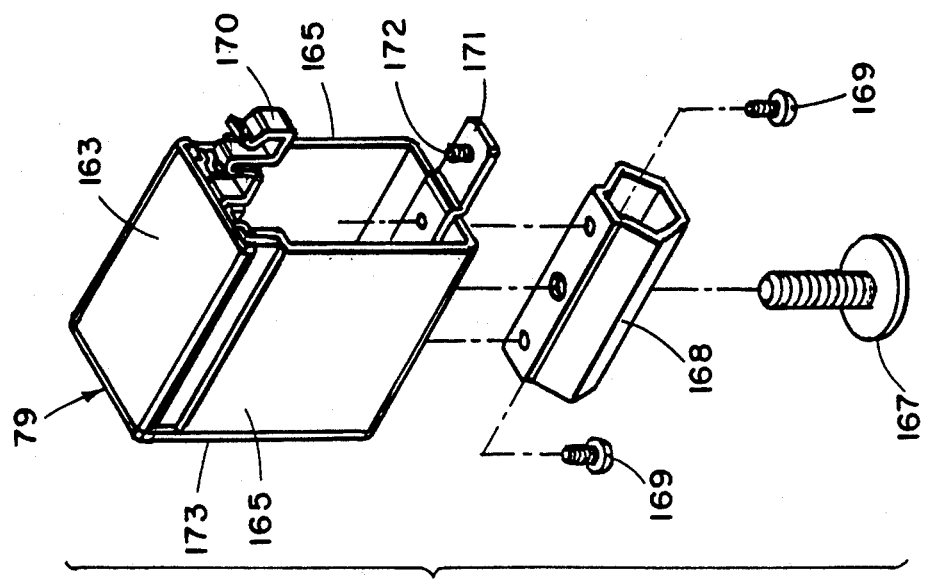
FIG. 24 is an exploded perspective view of the end-of-run cap.
Figure 22:
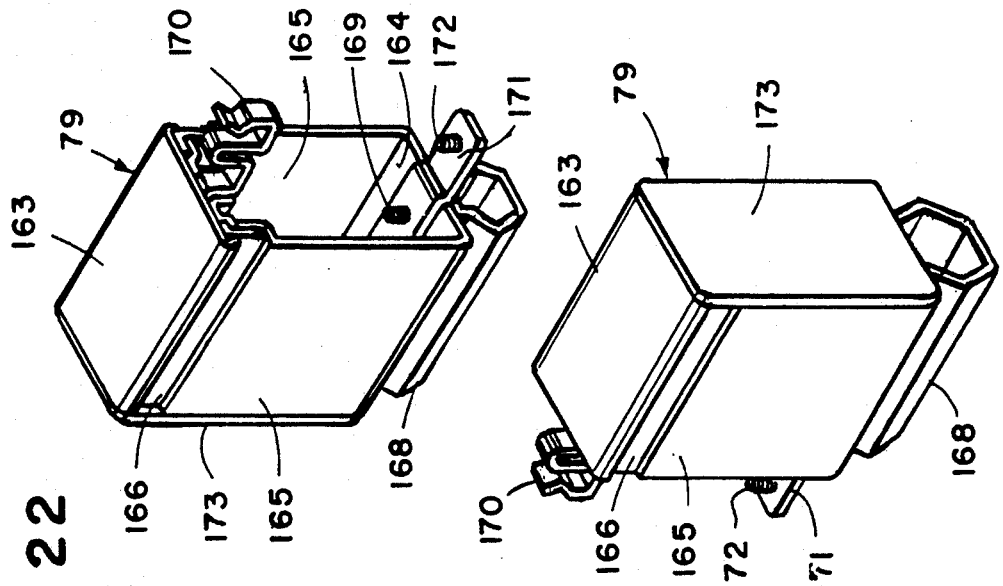
FIG. 22 is a rear perspective view of an end-of-run cap.
Figure 23:
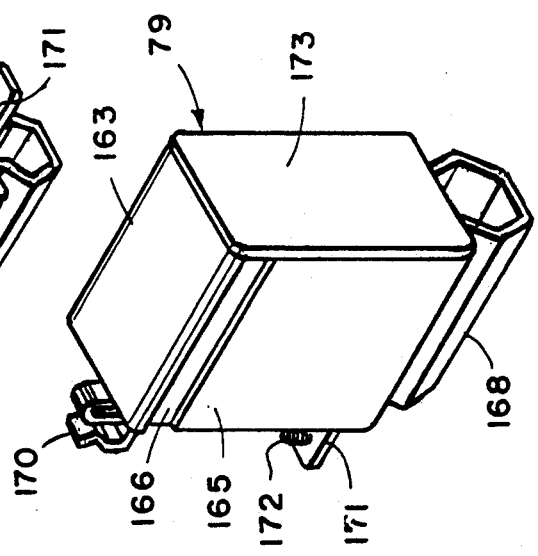
FIG. 23 is a front perspective view of the end-of-run cap.
Figure 29:
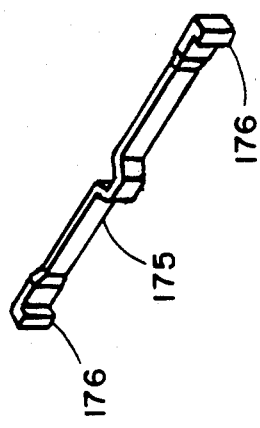
FIG. 29 is a perspective view of a power connector.
Figure 28:
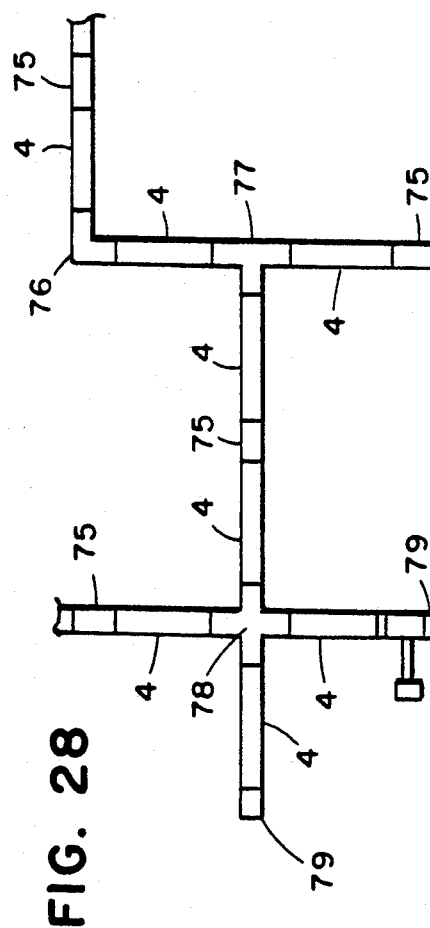
FIG. 28 is a top plan view of the floor track system, shown in a preselected configuration.
Figure 33:
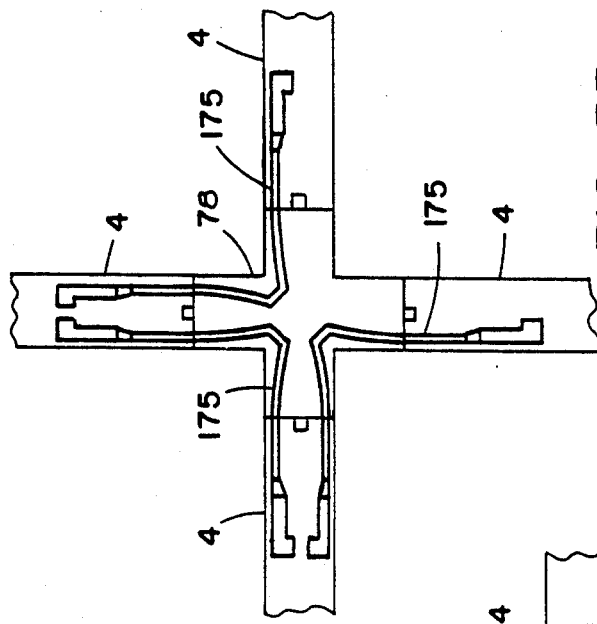
FIG. 33 is a top plan view of three power connectors, shown assembled in an X-connector.
Figure 30:
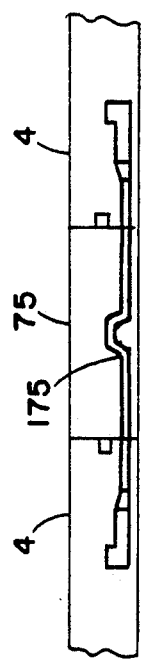
FIG. 30 is a top plan view of the power connector shown assembled in an in-line connector.
Figure 32:
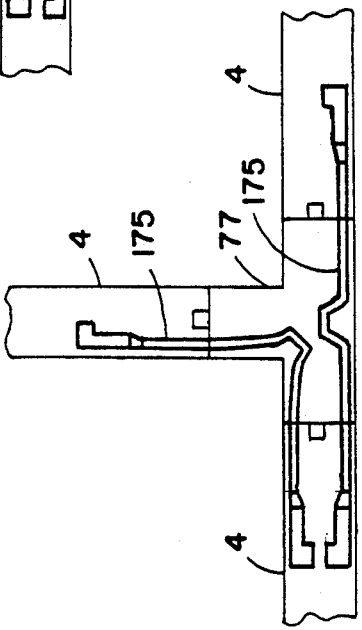
FIG. 32 is a top plan view of two power connectors, shown assembled in a T-connector.
Figure 31:
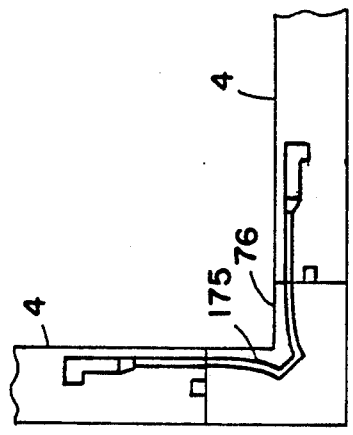
FIG. 31 is a top plan view of the power connector, shown assembled in a 90° connector.

The connectors 8 serve to fill the gap or space thus formed between the ends of adjacent floor tracks 4, and physically interconnect the same. In other words, connectors 8 normally extend in front of the furniture end supports 20, 21 or 22, and interconnect the ends of adjacent floor tracks in an end-to-end relationship. A variety of differently shaped connectors 8 are preferably provided to facilitate arranging floor track system 1 in any desired configuration. In the illustrated example, five different types of connectors are provided, comprising an in-line connector 75 (FIGS. 14 and 15), a 90° or L-connector 76 (FIGS. 16 and 17), a T-connector 77 (FIGS. 18 and 19), an X-connector 78 (FIGS. 20 and 21) and an end-of-run cap 79 (FIGS. 22–24). Each of the connectors 75–79 has an overall configuration, exterior surface treatment, and vertical cross-sectional shape similar to that of the floor tracks 4, so that when floor tracks 4 and connectors 8 are combined, the resultant floor track system 1 has a uniform appearance. Floor track system 1 may contain more than one of any type of connectors 75–79, and it is preferred that all connectors of any one type be identical, so that they can be used universally anywhere in floor track system 1. For purposes of description herein, reference will be had to only one of any one type of each of the connectors 75–79.

The in-line connector 75 (FIGS. 14–15) is constructed somewhat similarly to floor track 4, and includes a weld assembly 85, comprising a top plate 86, a bottom plate 87, and interconnecting spacers 88. In-line connector 75 does not have separate feet, but rather is supported on opposite sides by the adjacent floor tracks 4, as described in greater detail hereinafter. Like floor track 4, in-line connector 75 includes a U-shaped intermediate channel 89 attached to spacers 88. Intermediate channel 89 is shaped to receive casual wiring therein, and vertically divides in-line connector 75 into an upper, cable raceway 90, and a lower, power raceway 91. The lower surface of top plate 86 includes slots along opposite sides in which flexible wireway covers 92 are received, which serve to selectively close the sides of the cable raceway 90 and permit cabling to be inserted into and withdrawn therefrom.

In-line connector 75 also includes a pair of trim plates 93 which selectively cover the sides of power raceway 91. Each trim plate 93 includes an in-turned upper lip 94, which hooks over the flanges of intermediate channel 89, and a lower lip 95, which is detachably connected with weld assembly 85 by a spring clip 96. An accordion-shaped light seal 97 is attached to the lower surface of bottom plate 87 by fasteners 98. Light seal 97 is substantially identical in construction to the light seal 50 on floor track 4, and is flexible, so as to abut the floor 6, and close off the space between the floor and the lower surface of in-line connector 75 to present a neat, finished appearance to floor track system 1.

In-line connector 75 has latches 101 positioned at opposite ends thereof, which detachably connect with the ends of adjacent floor tracks 4 to physically interconnect the same, and form a continuous utility raceway. The illustrated in-line connector 75 includes a pair of latch tabs 102, which are fixedly attached to the top plate 86 of weld assembly 85 and project longitudinally outwardly thereof. Each of the latch tabs 102 has an inverted U-shaped configuration with an outwardly bent free end, and is adapted to be vertically inserted into, and closely received within, an associated latch slot 49 in an adjacent floor track 4. The latch tabs 102 are in the nature of resilient arms or stiff leaf spring, so that they can readily snap into the mating latch apertures 49 of floor track 4. A pair of fastener plates 103 are fixedly attached to the bottom plate 86 of weld assembly 85, and protrude longitudinally outwardly thereof. Fastener plates 103 each include an upwardly projecting, threaded stud 104, which is shaped to be received within one of the mating latch apertures 52 in the bottom plate 42 of floor track 4.

Floor tracks 4 are assembled into a given floor track system 1 by first placing them in line on the floor 6 of building space 3, with gaps or spaces between their ends. An in-line connector 75 is attached to one of the floor tracks 4 by first vertically aligning the associated stud 104 and elongated fastener aperture 52 in the bottom plate 87 of floor track 4, as well as latch tab 102 with latch slot 49. The in-line connector 75 is then translated downwardly in the manner illustrated in FIG. 25, until stud 104 is received through aperture 52, and latch tab 102 is fully received within the latch slot 49 in the top plate 86 of floor track 4. A nut 105 is then threaded onto the free end of stud 104, so as to positively interconnect the in-line connector 75 and the associated floor track 4. The opposite end of in-line connector 75 is attached to a second floor track 4 in a similar fashion, thereby interconnecting the two floor tracks 4 in a linear relationship.

The 90° or L-connector 76 (FIGS. 16 and 17) has a fixed wall construction that is somewhat dissimilar to the removable trim plate construction of in-line connector 75. The 90° connector includes a top plate 109, a bottom plate 110, and fixed sidewalls 111, which rigidly interconnect top plate 109 and bottom plate 110. An intermediate channel 112 divides 90° connector 76 into an upper, cable raceway 113, and a lower, power raceway 114. Flexible covers 115 close the exterior sides of cable raceway 113, and a rigid, ornamental cover 116 is positioned over the interior sides of cable raceway 113 which visually matches flexible covers 47, 92, and 115, and provides a symmetrical, consistent appearance to the 90° connector 76. A two-piece, accordion-shaped light seal 118 is attached to the lower surface of bottom plate 110 by fasteners 119.

The 90° connector 76 includes a latch tab 120, and a fastener plate 121 with upstanding threaded stud 122 at both ends of connector 76, which are configured similar to the corresponding latch members 102, 103 and 104 of in-line connector 75. The 90° connector 76 attaches to associated floor tracks 4 in a manner similar to that described above in connection with in-line connector 75, and as illustrated in FIGS. 25-27. The 90° connector 76 interconnects adjacent floor tracks 4 in a generally perpendicular relationship.

T-connector 77 (FIGS. 18 and 19) is similar to in-line connector 75, except for its "T" shape. T-connector 77 includes a weld assembly 125, comprising a top plate 126, a bottom plate 127, and interconnecting spacers 128. An intermediate channel 129 is attached to spacers 128, and divides the interior of T-connector 77 into an upper, cable raceway 130, and a lower, power raceway 131. The lower surface of top plate 126 includes marginal grooves in which a flexible wireway cover 132 is assembled along the straight edge of connector 77. A pair of rigid, ornamental covers 133 are mounted in the channels along the remaining edges of the connector 77, which visually match flexible covers 47, 92, 115 and 132 to provide a symmetrical, uniform appearance to the connector. A removable trim plate 134 covers the forward face of T-connector 77, and includes an upper lip 139 which hooks over the intermediate channel 129, and a lower lip 140 which is detachably connected with weld assembly 125 by a spring clip 135. The rearward faces of power raceway 131 are closed by fixed sidewalls 136. A two-part, accordion-shaped light seal 137 is attached to the lower surface of bottom plate 127 by fasteners 138.

The T-connector 77 includes a latch tab 141, and a fastener plate 142 with upstanding threaded stud 143 at both ends of connector 77, which are configured similarly to the corresponding latch members 102, 103 and 104 of in-line connector 75. T-connector 77 attaches to associated floor tracks 4 in a manner similar to that described above in connection with in-line connector 75, and as illustrated in FIGS. 25-27. T-connector 77 interconnects three floor tracks 4 in a T-shaped plan configuration.

The X-connector 78 (FIGS. 20 and 21) has a fixed wall construction similar to 90° connector 76, and includes top plate 146, a bottom plate 147 and rigid sidewalls 148. An intermediate channel 149 is mounted between sidewalls 148, and divides the interior of X-connector 78 into an upper, cable raceway 150, and a lower, power raceway 151. X-connector 78 includes four, rigid, ornamental covers 152 which are mounted adjacent top plate 146 and cover the sides of cable raceway 150. Ornamental covers 152 visually match flexible covers 47, 92, 115 and 132 and provide a uniform, symmetrical appearance to X-connector 78. A two-part, accordion-shaped light seal 154 is attached to bottom plate 147 by fasteners 155.

Each of the four open ends of the X-connector 78 includes a latch tab 156, and a fastener plate 157 with upstanding threaded stud 158. X-connector 78 is attached to associated floor tracks 4 in a manner similar to the in-line connector 75 discussed above, and as illustrated in FIGS. 25-27. X-connector 78 interconnects four floor tracks 4 in an X-shaped plan configuration.

End-of-run cap 79 (FIGS. 22-24) has a fixed wall construction similar to T-connector 77 and X-connector 78, and comprises a top plate 163, a bottom plate 164, and fixed sidewalls 165 which interconnect top plate 163 and bottom plate 164. Although the sidewalls 165 of end-of-run cap 79 are fixed, they are shaped similarly to the trim plate 93 of in-line connector 75, so that they visually match. Furthermore, a set pair of rigid, ornamental covers 166 are attached to the top plate 163 along the side edges thereof, and serve to match the flexible covers 92 of in-line connectors 75, even though end-of-run cap 79 does not have separate raceway areas. Unlike the other connectors 7, end-of-run cap 79 does have its own foot 167, which is similar to the foot 5 of floor track 4, and is vertically adjustable. A light seal 168 is attached to the lower surface of bottom plate 164 by fasteners 169.

End-of-run cap 79 includes at its open end a specially configured spring clip 170, which protrudes longitudinally and snaps into the latch slot 49 of an adjacent floor track 4. End-of-run cap 79 also includes a fastener plate 171 with upstanding threaded stud 172, which is configured similar to the corresponding latch members 103 and 104 of in-line connector 75. End-of-run cap 79 is attached to each open end of floor track system 1 to fully close the same, and is connected to the associated floor tracks 4 in a manner similar to that described above in connection with in-line connector 75, and as illustrated in FIGS. 25-27. A fixed end panel 173 closes the end-of-run cap 79 opposite latch tab 170.

Figure 34:
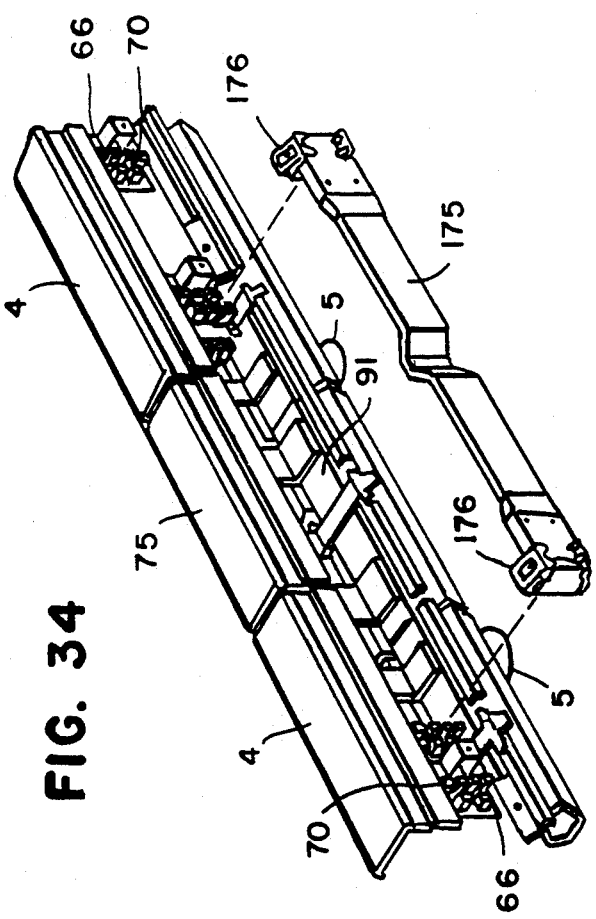
FIG. 34 is a perspective view of a portion of the floor track system, illustrating the assembly of a power connector into an in-line connector.

As best illustrated in FIGS. 29-34, a track-to-track power connector 175 is provided to electrically interconnect the powerways 66 of adjacent floor tracks 4. From an electrical connection standpoint, track-to-track power connector 175 is functionally similar to known panel-to-panel power connectors that are used in systems furniture, such as the arrangement disclosed in U.S. Pat. No. 4,376,561 to Vanden Hoek et al. However, physically, power connector 175 is specially shaped to be received within any one of connectors 75-78, and is flexible so as to assume a variety of different configurations therein. The opposite ends of power connector 175 include electrical connectors 176, which are of the quick-disconnect variety, and mate with the quick-disconnect electrical connectors 70 on the opposite ends of powerway 66. When adjacent floor tracks 4 are interconnected by an in-line connector 75, as illustrated in FIG. 34, power connector 175 is attached by simply plugging in connectors 176 into the mating connectors 70 in powerways 66, so that power connector 175 is bodily received within the powerway 91 of in-line connector 75. The trim plate 93 (FIG. 13) of in-line connector 75 is then placed over the open face of power raceway 91 to cover the same.

When adjacent floor tracks 4 are interconnected in a non-linear relationship (FIGS. 31-33) by either a 90° connector 76, a T-connector 77, or an X-connector 78, power connector 175 must be threaded through the open ends of the connector, and bent into the proper configuration. The end electrical connectors 176 of power connector 175 are then attached to the adjacent connectors 70 of powerway 66 in the manner described above.

Figure 35:
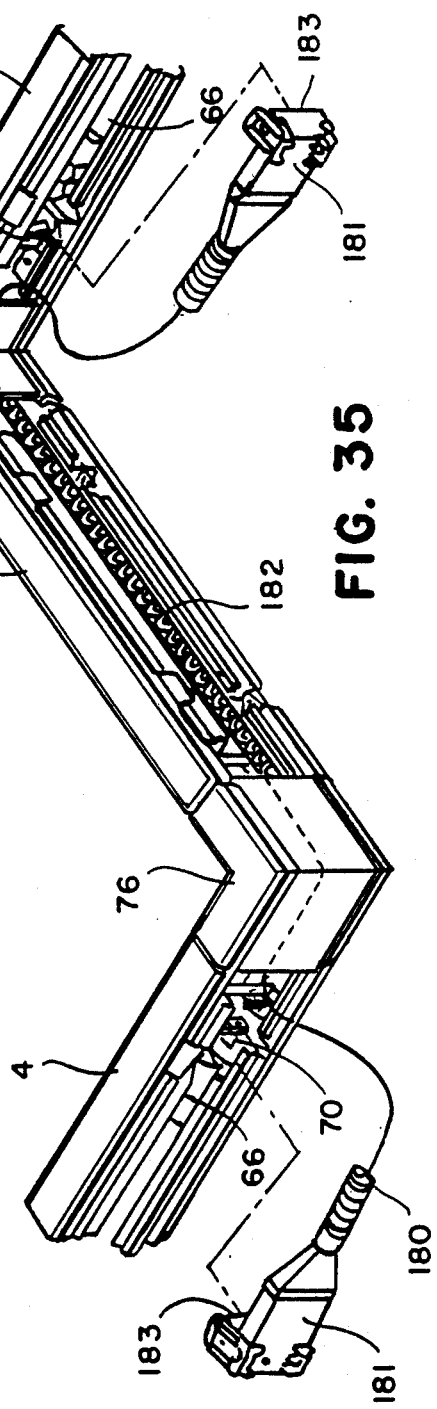
FIG. 35 is a perspective view of a selected portion of the floor track system, showing the installation of an alternative pass-through type of powerway.

An alternative pass-through powerway 180 is illustrated in FIG. 35, and includes end terminals 181 which are interconnected by a flexible conduit 182. The length of flexible conduit 182 may be varied in accordance with the particular application, so as to span at least one floor track 4. The end terminals 181 of pass-through powerway 180 have quick-disconnect connectors 183 which mate with the connectors 70 of powerways 66. Like powerway 175, passthrough power connector 180 must be threaded through the non-linear connectors 76-78.

Figure 36:
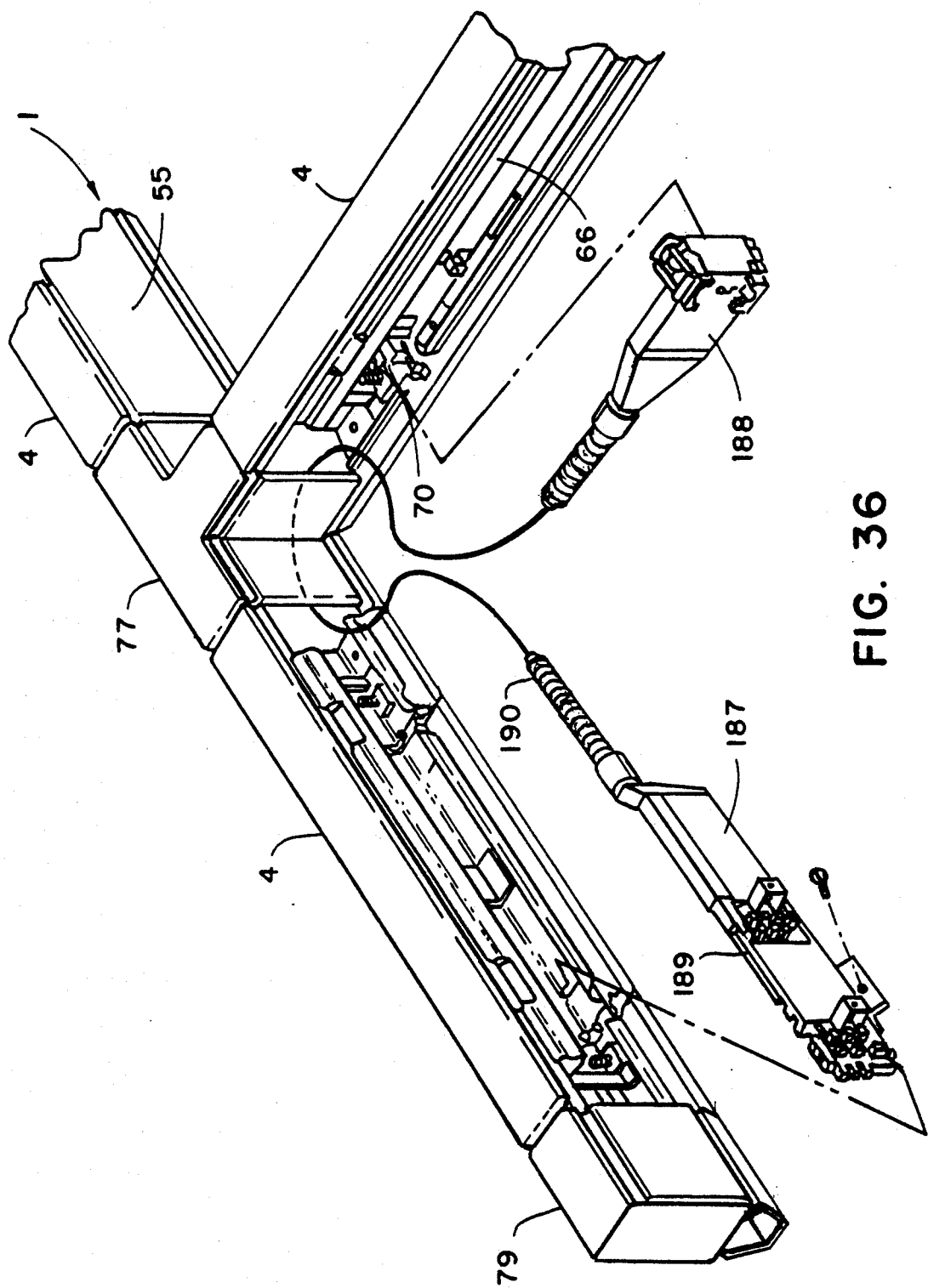
FIG. 36 is a perspective view of a selected portion of the floor track system, and another alternative powerway design.

Another alternate powerway 187 is illustrated in FIG. 36, and includes two different end terminals 188 and 189 interconnected by a flexible conduit 190. End terminal 188 is similar to the end terminal 181 of pass-through power connector 180. End terminal 189 has a special configuration, similar to one end of powerway 66, so as to permit attachment of an outlet receptacle 9 thereto.

In the example illustrated in FIG. 1, a base power-in assembly 192 provides electrical power to floor track system 1. The office space 6 has an electrical tombstone 193, with a special power-in adapter 194 that electrically connects with an end connector 70 in an adjacent powerway 66. Other types of power-in arrangements, such as ceiling poles, etc., can also be used to provide electrical power to floor track system 1.

With reference to FIGS. 43-50, a stabilizer bracket 195 is provided to detachably connect selected portions of the floor track system 1 with the modular furniture units 7 to positively prevent the raceway from being inadvertently dislodged from its preset configuration. In the illustrated example, stabilizer bracket 195 comprises a rigid band 196, having inwardly turned ends 197 spaced to fit over the opposite side edges of the floor track top plate 41. A threaded boss 198 extends upwardly from the upper surface of band 196, and is positioned laterally to one side of band 196, for purposes to be described in greater detail hereinafter.

In use, selected floor tracks 4 can be positively attached to certain furniture units 1 in the following manner. Before adjacent floor tracks 4 are interconnected by connectors 8, each stabilizer bracket 195 is assembled onto the top plate 41 of the selected floor track 4, with the boss 198 oriented under the back panel 25 of the furniture unit 7 to which the floor track is to be connected. After floor track system 1 is fully assembled, stabilizer bracket 195 can be slid longitudinally along the length of floor track 4 until boss 195 is aligned with a mating fastener aperture 202 in the lower flange of the furniture back panel 25. A threaded fastener 203 is then inserted downwardly through front panel aperture 202 from the interior side of furniture unit 7 into boss 198, and is screwed securely into place, as illustrated in FIG. 48. In this condition, floor track 4 is positively attached to an associated furniture unit 7, and cannot be kicked or otherwise inadvertently jarred or moved from its preset configuration.

In use, floor track system 1 is constructed in the following fashion. The location of each workstation 2 in the open office plan 3 is first determined. Floor tracks 4 and connectors 8 are then laid out on the floor 6 in accordance with the selected design. Next, floor tracks 4 are assembled with the selected connectors 75-78 in the manner illustrated in FIGS. 25-27. Any stabilizer brackets 195 desired are assembled onto floor tracks 4 before the same are interconnected in the manner shown in FIGS. 46 and 47. A stabilizer bracket 195 may be positioned on each floor track 4. End-of-run caps 78 are placed at the end of each run, so as to seal and isolate the raceway. In the event the floor tracks 4 are not prewired, powerways 66 are installed in those floor tracks 4 in which electrical power is needed, in the manner shown in FIG. 37. Outlet receptacles 9 are mounted at locations convenient to the workstations 2 in the manner illustrated in FIGS. 11 and 12. Track-to-track power connectors 175, and any alternative powerways 180 and 187, are then assembled in the manner shown in FIGS. 34-36 to electrically interconnect all floor tracks 4. Outlet receptacles 9 are mounted on powerways 66 in the manner illustrated in FIGS. 11-13. Due to the unique construction of floor track system 1, outlet receptacles 9 can be installed in power tracks 4 from either side of the system, and all of the base trim plates 55 can be easily removed and replaced, even after the furniture units 7 are set in place thereover. As a result, floor track system 1 has substantial flexibility to accommodate different circumstances. All base trim plates 55, 93 and 134 are then snapped into place to cover the associated floor tracks 4 and connectors 75 and 77. The feet 5 and 167 of the floor tracks 4 and end-of-line cap 79 are then adjusted, so that the light seal contacts both the floor 6 and the lower surface of the floor tracks 4 to provide a neat, finished appearance to floor track system 1. The resultant assembly will have the appearance illustrated in FIG. 10. Furniture units 7 are then assembled over the floor track in the manner illustrated in FIG. 3, so as to achieve the finished configuration illustrated in FIG. 2. When two furniture units 7 are positioned closely together, such as with their front panels 25 facing one another as shown in FIG. 48, the associated recesses 28 in furniture units 7 combine to form a channel which is wide enough to completely house floor tracks 4 and in-line connectors 27. The associated recesses 28 in furniture units 7 similarly combine at the corners to cover non-linear connectors 76, 77, and 78. When furniture units 7 are placed over only one side of floor track system 1, the floor tracks 4 and in-line connectors 27 protrude outwardly from the associated furniture recess 28 approximately one-half of their width. Each stabilizer bracket 195 should then be attached to the back panel 25 of the adjacent furniture unit 7 with fasteners 203.

Low voltage cables, such as communication lines, computer wiring, and the like can be conveniently routed through floor track system 1, even after the furniture units 7 are set in place. As best illustrated in FIGS. 40-42, such cabling 208 is inserted into the associated casual wireway, such as floor track wireway 64 and in-line connector wireway 90, by simply pushing the wiring past flexible covers 47 and 92 into the underlying intermediate channel. The resiliency of the flexible covers 47 and 197 returns the same to their original position in covering the associated slot. With respect to those connectors 8 which do not have a flexible cover, such as 90° connector 76, X-connector 78, and the short leg of T-connector 77, casual wiring 42 must be threaded through the associated casual wireway in the manner illustrated in FIG. 42. Notches 209 may be provided in intermediate channels 62 to facilitate cabling between the ends of casual wireway 64.

Figure 52:
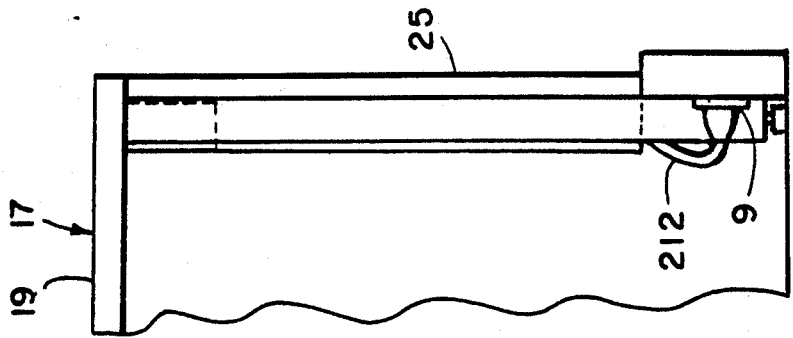
FIG. 52 is a side elevational view of the floor track system, shown with a modular furniture unit positioned thereover.
Figure 51:
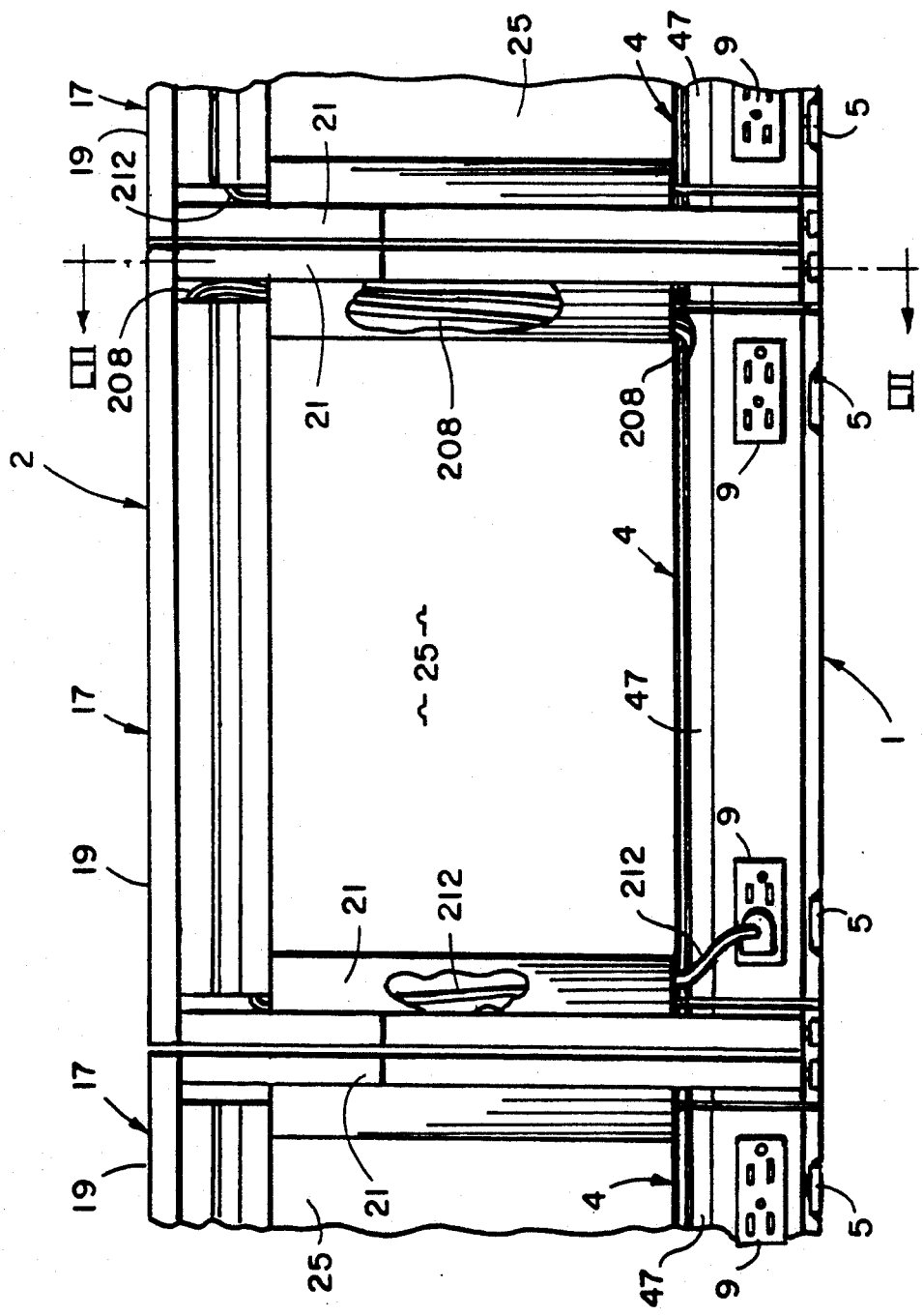
FIG. 51 is a rear elevational view of the floor track system, shown positioned over associated modular furniture units.

Power cables 212 from task lighting, work top computers, and other similar equipment are simply plugged into the closest outlet receptacle 9, in the manner shown in FIGS. 51 and 52. In the illustrated example, furniture units 7 have a unique wire routing and cover arrangement, including covers 213. Preferably, power cables 212 and low voltage cables 208 are routed along opposite ends of work surface 19. The illustrated floor track system 1 does not electrically interact with furniture units 7, but simply provides baseboard wiring therefor.

Floor track system 1 provides a very flexible system to accommodate a wide variety of different space and workstation requirements. The floor track system 1 forms a continuous, self-contained and self-supporting utility raceway that is physically separate from the furniture units 7, yet dimensionally cooperates and blends in with them.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A modular furniture arrangement for open office plans, comprising:
 a plurality of individual furniture units, each having means for independently supporting the same on a floor surface of an open office plan, and being shaped for selective positioning on the floor surface in a predetermined configuration to define a plurality of distinct workstations;
 a floor track system providing utilities to said workstations, including a plurality of elongated floor track segments, each said segment having:
  a hollow construction with an exterior wall shaped to define a longitudinally extending duct therein adapted to receive and isolate the utilities;
  means for abuttingly engaging the floor surface, and independently supporting said floor track segment in a generally upright orientation on the floor surface;
  an exterior shape which physically mates with said furniture units, without supporting the same;
  means adjacent the opposite ends of said floor track segment for detachably interconnecting adjacent floor track segments in an end-to-end fashion to form a continuous, self-contained and self-supported utility raceway that is physically separate from said furniture units, yet is shaped in a predetermined configuration to cooperate with the same;
 means for introducing the utilities into said raceway;
 means adjacent each of said workstations for tapping the utilities from said raceway to provide utilities to each of said workstations; and wherein
 said furniture units each include a base area which extends along a forward portion of said furniture unit, with a recess shaped to receive at least a portion of an associated one of said floor track segments therein to physically mate with and blend into said floor track system.

2. A modular furniture arrangement as set forth in claim 1, wherein:
 said furniture unit recess has a depth which is substantially equal to or greater than one-half of the width of said floor track segments, whereby when adjacent furniture units are positioned closely together with their forward portions facing one another, the associated recesses form a channel therebetween which is large enough to wholly receive at least one of said floor track segments therein.

3. A modular furniture arrangement as set forth in claim 2, wherein:
 said floor track interconnecting means is configured so as to permit said raceway to be assembled on the floor surface prior to placement of said furniture units thereover.

4. A modular furniture arrangement as set forth in claim 3, including:
 means for detachably connecting selected portions of said raceway with said furniture units to positively prevent said raceway from being inadvertently dislodged from its predetermined configuration.

5. A modular furniture arrangement as set forth in claim 4, wherein said floor track interconnecting means includes:
 first and second fastening means positioned adjacent the opposite ends of said floor track segments;
 a plurality of track connectors, each having:
  a hollow construction with an exterior wall shaped to define a longitudinally extending duct therein adapted to communicate with an adjacent floor track segment duct, and receive and isolate the utilities;
  third and fourth fastening means positioned adjacent opposite ends of said track connectors, and shaped to detachably engage said first and second fastening means, whereby said track connectors rigidly interconnect said floor track segments.

6. A modular furniture arrangement as set forth in claim 5, wherein:
each of said floor track segments includes an electrical powerway mounted therein which extends generally between the opposite ends of said floor track segment, and includes electrical connectors adjacent opposite ends of said powerway.

7. A modular furniture arrangement as set forth in claim 6, including:
a plurality of track-to-track power connectors, each being shaped for reception in an associated one of said track connectors, and having electrical connectors positioned adjacent opposite ends thereof which mate with the electrical connectors on said powerways to electrically interconnect adjacent floor track segments.

8. A modular furniture arrangement as set forth in claim 7, wherein:
said floor track segments each have a generally straight plan configuration.

9. A modular furniture arrangement as set forth in claim 8, wherein:
said track connectors include at least one in-line connector having a generally straight plan configuration to join two adjacent floor track segments in a linear relationship.

10. A modular furniture arrangement as set forth in claim 9, wherein:
said track connectors include at least one 90° connector, having a generally L-shaped plan configuration to join two adjacent floor track segments in an angular relationship.

11. A modular furniture arrangement as set forth in claim 10, wherein:
said track connectors include at least one T-connector, having a generally T-shaped plan configuration to join three adjacent floor track segments.

12. A modular furniture arrangement as set forth in claim 11, wherein:
said track connectors include at least one X-connector, having a generally X-shaped plan configuration to join four adjacent floor track segments.

13. A modular furniture arrangement as set forth in claim 12, wherein:
said track connectors include at least one end-of-run cap having one closed end to enclose and isolate said floor track system.

14. A modular furniture arrangement as set forth in claim 13, wherein:
said floor track segments each have first and second feet depending from the opposite ends thereof which abuttingly engage the floor surface and support said floor track segments thereon.

15. A modular furniture arrangement as set forth in claim 14, wherein:
said first and second feet include means for vertically adjusting the same with respect to said floor track segments to accommodate for uneven floor surfaces.

16. A modular furniture arrangement as set forth in claim 15, wherein:
said floor track segments each include a light seal positioned along a lower edge of said floor track segment, and shaped to abut the floor and form a seal therebetween.

17. A modular furniture arrangement as set forth in claim 16, wherein said floor track segments each include:
a powerway area in which at least a portion of said powerway is received; and
a casual wire area, separate and isolated from the powerway area of said floor track segment, in which casual wiring is received.

18. A modular furniture arrangement as set forth in claim 17, wherein said track connectors each include:
a powerway area in which at least a portion of said power connector is received; and
a casual wire area, separate and isolated from the powerway area of said track connector, in which casual wiring is received.

19. A modular furniture arrangement as set forth in claim 18, wherein:
said floor track segments each include first and second access channels extending substantially continuously along opposite sides of said floor track segment, and communicating with the casual wire area of said floor track segment to facilitate inserting and withdrawing casual wiring from either side of said floor track system.

20. A modular furniture arrangement as set forth in claim 19, wherein:
said track connectors each include first and second access channels extending substantially continuously along opposite sides of said track connector, and communicating with the casual wire area of said floor track connector to facilitate inserting and withdrawing casual wiring from either side of said floor track system.

21. A modular furniture arrangement as set forth in claim 20, wherein:
said first and second fastening means on the opposite ends of said floor track segments are substantially identical; and
said third and fourth fastening means on the opposite ends of said track connectors are substantially identical.

22. A modular furniture arrangement as set forth in claim 21, wherein:
said first and second fastening means are positioned within the ends of said floor track segments, and include:
a) a latch notch disposed adjacent an upper portion thereof; and
b) a fastener aperture disposed adjacent a lower portion thereof.

23. A modular furniture arrangement as set forth in claim 22, wherein:
said third and fourth fastening means protrude outwardly from the ends of said track connectors, and include:
a) a latch disposed adjacent an upper portion thereof, and shaped for vertical insertion and close reception into the latch notch of an adjacent one of said floor track segments; and
b) a fastener disposed adjacent a lower portion thereof, and shaped for vertical insertion through the fastener aperture of an adjacent one of said floor track segments.

24. A modular furniture arrangement as set forth in claim 23, wherein:
said powerway includes at least one quick-disconnect connector disposed adjacent a side portion of said floor track segment; and said tapping means includes at least one outlet receptacle having at least one conventional plug receptacle, and a quick-disconnect connector which mates with said powerway quick-disconnect connector.

25. A modular furniture arrangement as set forth in claim 1, wherein:
said floor track interconnecting means is configured so as to permit said raceway to be assembled on the floor surface prior to placement of said furniture units thereover.

26. A modular furniture arrangement as set forth in claim 1, including:
means for detachably connecting selected portions of said raceway with said furniture units to positively prevent said raceway from being inadvertently dislodged from its predetermined configuration.

27. A modular furniture arrangement as set forth in claim 1, wherein:
each of said floor track segments includes an electrical powerway mounted therein which extends generally between the opposite ends of said floor track segment, and includes electrical connectors adjacent opposite ends of said powerway.

28. A modular furniture arrangement as set forth in claim 1, wherein said floor track interconnecting means includes:
first and second fastening means positioned adjacent the opposite ends of said floor track segments;
a plurality of track connectors, each having:
a hollow construction with an exterior wall shaped to define a longitudinally extending duct therein adapted to communicate with an adjacent floor track segment duct, and receive and isolate the utilities;
third and fourth fastening means positioned adjacent opposite ends of said track connectors, and shaped to detachably engage said first and second fastening means, whereby said track connectors rigidly interconnect said floor track segments.

29. A modular furniture arrangement as set forth in claim 28, wherein:
said floor track segments each have a generally straight plan configuration.

30. A modular furniture arrangement as set forth in claim 28, wherein:
said track connectors include at least one in-line connector having a generally straight plan configuration to join two adjacent floor track segments in a linear relationship.

31. A modular furniture arrangement as set forth in claim 28, wherein:
said track connectors include at least one 90° connector, having a generally L-shaped plan configuration to join two adjacent floor track segments in an angular relationship.

32. A modular furniture arrangement as set forth in claim 28, wherein:
said track connectors include at least one T-connector, having a generally T-shaped plan configuration to join three adjacent floor track segments.

33. A modular furniture arrangement as set forth in claim 28, wherein:
said track connectors include at least one X-connector, having a generally X-shaped plan configuration to join four adjacent floor track segments.

34. A modular furniture arrangement as set forth in claim 28, wherein:
said track connectors include at least one end-of-run cap having one closed end to enclose and isolate said floor track system.

35. A modular furniture arrangement as set forth in claim 28, wherein said track connectors each include:
a powerway area in which at least a portion of said power connector is received; and
a casual wire area, separate and isolated from the powerway area of said track connector, in which casual wiring is received.

36. A modular furniture arrangement as set forth in claim 1, wherein said floor track segments each include:
a powerway area in which at least a portion of an electrical powerway is received; and
a casual wire area, separate and isolated from the powerway area of said floor track segment, in which casual wiring is received.

37. A modular furniture arrangement as set forth in claim 1, wherein:
each of said floor track segments includes an electrical powerway mounted therein which extends generally between the opposite ends of said floor track segment; said powerway including at least one quick-disconnect connector disposed adjacent a side portion of said floor track segment; and
said tapping means includes at least one outlet receptacle having at least one conventional plug receptacle, and a quick-disconnect connector which mates with said powerway quick-disconnect connector.

38. A modular furniture arrangement for open office plans, comprising:
a plurality of individual furniture units, each having means for independently supporting the same on a floor surface of an open office plan, and being shaped for selective positioning on the floor surface in a predetermined configuration to define a plurality of distinct workstations;
a floor track system providing utilities to said workstations, including a plurality of elongated floor track segments, each having:
a hollow construction with an exterior wall shaped to define a longitudinally extending duct therein adapted to receive and isolate the utilities;
means for abuttingly engaging the floor surface, and independently supporting said floor track segment in a generally upright orientation on the floor surface;
an exterior shape which physically mates with said furniture units, without supporting the same;
means adjacent the opposite ends of said floor track segment for detachably interconnecting adjacent floor track segments in an end-to-end fashion to form a continuous, self-contained and self-supported utility raceway that is physically separate from said furniture units, yet is shaped in a predetermined configuration to cooperate with the same;
said floor track interconnecting means including:
first and second fastening means positioned adjacent the opposite ends of said floor track segments;
a plurality of track connectors, each having:
a hollow construction with an exterior wall shaped to define a longitudinally extending duct therein adapted to communicate with an adjacent floor track segment duct, and receive and isolate the utilities;

third and fourth fastening means positioned adjacent opposite ends of said track connectors, and shaped to detachably engage said first and second fastening means, whereby said track connectors rigidly interconnect said floor track segments;

said first and second fastening means are positioned within the ends of said floor track segments, and include:
- a latch notch disposed adjacent an upper portion thereof; and
- a fastener aperture disposed adjacent a lower portion thereof.

means for introducing the utilities into said raceway; and means adjacent each of said workstations for tapping the utilities from said raceway to provide utilities to each of said workstations.

39. A modular furniture arrangement as set forth in claim 38, wherein:

said third and fourth fastening means protrude outwardly form the ends of said track connectors, and include:
- a latch disposed adjacent an upper portion thereof, and shaped for vertical insertion and close reception into the latch notch of an adjacent one of said floor track segments; and
- a fastener disposed adjacent a lower portion thereof, and shaped for vertical insertion through the fastener aperture of an adjacent one of said floor track segments.

40. A modular furniture arrangement as set forth in claim 39, wherein:

said powerway includes at least one quick-disconnect connector disposed adjacent a side portion of said floor track segment; and said tapping means includes at least one outlet receptacle having at least one conventional plug receptacle and a quick-disconnect connector which mates with said powerway quick-disconnect connector.

* * * * *